(12) United States Patent
Omer et al.

(10) Patent No.: US 11,403,543 B2
(45) Date of Patent: *Aug. 2, 2022

(54) DETERMINING A LOCATION OF MOTION DETECTED FROM WIRELESS SIGNALS

(71) Applicant: Cognitive Systems Corp., Waterloo (CA)

(72) Inventors: Mohammad Omer, Waterloo (CA); Stephen Arnold Devison, Kitchener (CA)

(73) Assignee: Cognitive Systems Corp., Waterloo (CA)

( * ) Notice: Subject to any disclaimer, the term of this patent is extended or adjusted under 35 U.S.C. 154(b) by 912 days.

This patent is subject to a terminal disclaimer.

(21) Appl. No.: 16/207,673

(22) Filed: Dec. 3, 2018

(65) Prior Publication Data

US 2020/0175405 A1    Jun. 4, 2020

(51) Int. Cl.
| | |
|---|---|
| *G06N 7/00* | (2006.01) |
| *H04W 84/18* | (2009.01) |
| *G06F 17/16* | (2006.01) |
| *H04W 4/02* | (2018.01) |

(52) U.S. Cl.
CPC ............ *G06N 7/005* (2013.01); *G06F 17/16* (2013.01); *H04W 4/027* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 4,054,879 A | 10/1977 | Wright et al. | |
| 4,649,388 A | 3/1987 | Atlas | |
| 4,740,045 A | 4/1988 | Goodson et al. | |
| 5,270,720 A | 12/1993 | Stove | |
| 5,613,039 A | 3/1997 | Wang et al. | |
| 5,696,514 A | 12/1997 | Nathanson et al. | |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

WIPO, International Search Report and Written Opinion dated Mar. 6, 2020, in PCT/CA2019/051527, 10 pgs.

(Continued)

*Primary Examiner* — Syed A Roni
(74) *Attorney, Agent, or Firm* — Henry Patent Law Firm PLLC

(57) ABSTRACT

In a general aspect, a method for determining a location of motion detected by wireless communication devices in a wireless communication network includes obtaining motion data associated with a first time frame. The motion data includes a set of motion indicator values. The method also includes generating a first probability vector based on the set of motion indicator values and obtaining a second probability vector generated from motion data associated with a prior time frame. The method additionally includes obtaining a transition probability matrix that includes transition values and non-transition values. The method further includes determining, by operation of a data processing apparatus, a location of the motion detected from the wireless signals exchanged during the first time frame.

30 Claims, 9 Drawing Sheets

(56) References Cited

U.S. PATENT DOCUMENTS

| | | |
|---|---|---|
| 6,075,797 A | 6/2000 | Thomas |
| 6,380,882 B1 | 4/2002 | Hegnauer |
| 6,573,861 B1 | 6/2003 | Hommel et al. |
| 6,914,854 B1 | 7/2005 | Heberley et al. |
| 7,250,907 B2 | 7/2007 | Krumm et al. |
| 7,652,617 B2 | 1/2010 | Kurtz et al. |
| 7,738,881 B2 | 6/2010 | Krumm et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,030,321 B2 | 5/2015 | Breed |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,648,462 B2 | 5/2017 | Nagy et al. |
| 9,692,459 B2 | 6/2017 | Maltsev et al. |
| 9,743,294 B1 | 8/2017 | Omer et al. |
| 9,869,759 B2 | 1/2018 | Furuskog et al. |
| 9,924,325 B2 | 3/2018 | Tanaka |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,506,384 B1 | 12/2019 | Omer et al. |
| 10,567,914 B1 | 2/2020 | Omer et al. |
| 2003/0108119 A1 | 6/2003 | Mohebbi et al. |
| 2005/0258957 A1 | 11/2005 | Krumm et al. |
| 2006/0152404 A1 | 7/2006 | Fullerton et al. |
| 2006/0284757 A1 | 12/2006 | Zemany |
| 2007/0149197 A1 | 6/2007 | Lee et al. |
| 2007/0296571 A1 | 12/2007 | Kolen |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0303655 A1 | 12/2008 | Johnson |
| 2009/0062696 A1 | 3/2009 | Nathan et al. |
| 2009/0180444 A1 | 7/2009 | Mcmanus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2011/0058028 A1 | 3/2011 | Sakai |
| 2011/0090081 A1 | 4/2011 | Khorashadi et al. |
| 2012/0115512 A1 | 5/2012 | Grainger et al. |
| 2012/0146788 A1 | 6/2012 | Wilson et al. |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355595 A1 | 12/2014 | Curtiss |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0097653 A1 | 4/2015 | Gibbs et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2016/0018508 A1 | 1/2016 | Chen et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2016/0262355 A1 | 9/2016 | Swan |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0126488 A1 | 5/2017 | Cordeiro et al. |
| 2017/0146656 A1 | 5/2017 | Belsley et al. |
| 2017/0155439 A1 | 6/2017 | Chang et al. |
| 2017/0195893 A1 | 7/2017 | Lee et al. |
| 2017/0223628 A1 | 8/2017 | Snyder et al. |
| 2017/0278374 A1 | 9/2017 | Skaaksrud |
| 2017/0280351 A1 | 9/2017 | Skaaksrud |
| 2017/0311279 A1 | 10/2017 | Allegue Martinez, et al. |
| 2017/0311574 A1 | 11/2017 | Swan |
| 2017/0343658 A1 | 11/2017 | Ramirez et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0180706 A1 | 6/2018 | Li et al. |
| 2018/0288587 A1 | 10/2018 | Allegue Martinez et al. |
| 2018/0330293 A1 | 11/2018 | Kulkarni et al. |
| 2019/0158340 A1 | 5/2019 | Zhang et al. |
| 2020/0178033 A1 | 6/2020 | Omer et al. |

FOREIGN PATENT DOCUMENTS

| | | |
|---|---|---|
| GB | 2518926 | 4/2015 |
| JP | 1997-507298 | 7/1997 |
| JP | 2004286567 | 10/2004 |
| JP | 2013072865 | 4/2013 |
| WO | 2014/021574 | 2/2014 |
| WO | 2014/201574 | 12/2014 |
| WO | 2015/168700 | 11/2015 |
| WO | 2016005977 | 1/2016 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017177303 | 10/2017 |
| WO | 2017/210770 | 12/2017 |
| WO | 2018/094502 | 5/2018 |
| WO | 2019041019 | 3/2019 |

(56) References Cited

FOREIGN PATENT DOCUMENTS

OTHER PUBLICATIONS

USPTO, Final Office Action dated Mar. 25, 2020, in U.S. Appl. No. 16/669,177, 20 pgs.
USPTO, Notice of Allowance dated Aug. 6, 2019, in U.S. Appl. No. 16/399,657, 27 pgs.
USPTO, Non-Final Office Action dated Aug. 8, 2019, in U.S. Appl. No. 16/399,681, 30 pgs.
USPTO, Notice of Allowance dated Aug. 8, 2019, in U.S. Appl. No. 16/207,649, 37 pgs.
Domenico, et al., "Exploring Training Options for RF Sensing Using CSI", IEEE Communications Magazine, 2018, vol. 56, Issue 5, pp. 116-123, 8 pgs.
Iqbal, et al., "Indoor Motion Classification Using Passive RF Sensing Incorporating Deep Learning", ISSN 2577-2465, Electronic IEEE, Jun. 3, 2018, 5 pgs.
Kosba, et al., "Robust WLAN Device-free Passive Motion Detection", IEEE Wireless Communications and Networking Conference, Apr. 2012, 6 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.
USPTO, Notice of Allowance dated Dec. 30, 2019, in U.S. Appl. No. 16/399,681, 13 pgs.
USPTO, Non-Final Office Action dated Dec. 23, 2019, in U.S. Appl. No. 16/669,177, 33 pgs.
WIPO, International Search Report and Written Opinion dated Jan. 28, 2020, in PCT/CA2019/051529, 7 pgs.
Shi, et al., "Accurate Location Tracking from CSI-based Passive Device-free Probabilistic Fingerprinting", IEEE Transactions on Vehicular Technology, vol. 67, No. 6, Jun. 2018, 19 pgs.
Youssef, et al., "Challenges: Device-free Passive Localization for Wireless Environments", Proceedings of the 13th Annual ACM Int'l Conference on Mobile Computing and Networking, Montreal, Canada, Sep. 9, 2007, 8 pgs.
USPTO, Advisory Action dated Jun. 2, 2020, in U.S. Appl. No. 16/669,177, 3 pgs.
WIPO, International Search Report and Written Opinion dated Feb. 3, 2020, in PCT/CA2019/051154, 12 pgs.
EPO, Extended European Search Report dated Dec. 8, 2021, in EP 19892363.3, 8 pgs.
Pei, et al., "Using Motion-Awareness for the 3D Indoor Personal Navigation on a Smartphone", 24th International Technical Meeting of the Satellite Division of The Institute of Navigation, Portland, OR, Sep. 19, 2011, 8 pgs.
EPO, Extended European Search Report dated Jan. 5, 2022, in EP 19893465.5, 5 pgs.

DETERMINING A LOCATION OF MOTION DETECTED FROM WIRELESS SIGNALS

BACKGROUND

The following description relates to determining a location of motion detected from wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1:
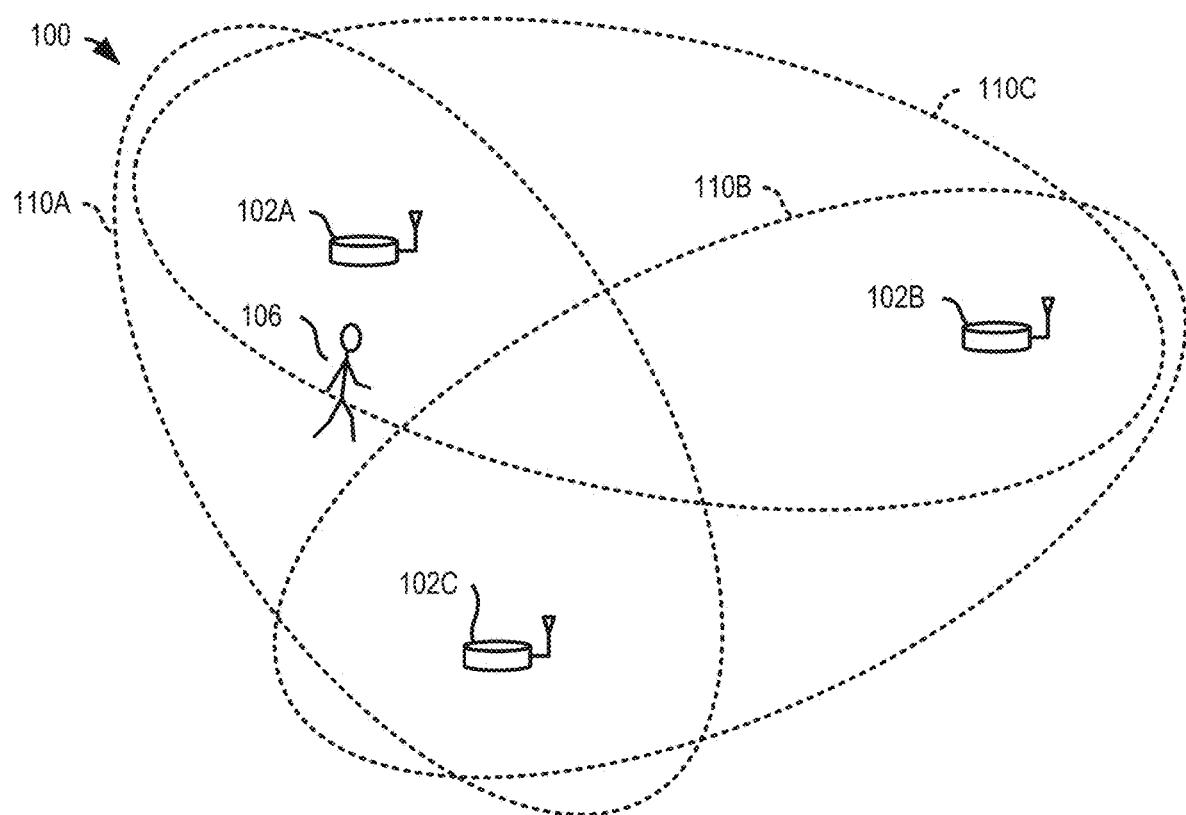
FIG. 1 is a diagram showing an example wireless communication system.

In some aspects of what is described here, the location of motion in a space (e.g., the particular room in a house where a person is moving, a particular floor or quadrant of a building where a person is moving, etc.) may be detected using information from multiple wireless communication devices communicating with each other wirelessly.

For instance, wireless signals received at each of the wireless communication devices in a wireless communication network may be analyzed to determine channel information for the different communication links in the network (between respective pairs of wireless communication devices in the network). The channel information may be representative of a physical medium that applies a transfer function to wireless signals that traverse the space. In some instances, the channel information includes channel response information. Channel response information may refer to known channel properties of a communication link, and may describe how a wireless signal propagates from a transmitter to a receiver, representing the combined effect of, for example, scattering, fading, and power decay within the space between the transmitter and receiver. In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming steering matrix may include a mathematical description of how the antenna array should use each of its individual antenna elements to select a spatial path for transmission. While certain aspects are described herein with respect to channel response information, beamforming state information or beamformer steering matrix state may also be used in the aspects described as well.

The channel information for each of the communication links may be analyzed (e.g., by a hub device or other device in the network, or a remote device communicably coupled to the network) to detect whether motion has occurred in the space, to determine a relative location of the detected motion, or both. In some aspects, the channel information for each of the communication links may be analyzed to detect whether an object is present or absent, e.g., when no motion is detected in the space.

In some implementations, the wireless communication network may include a wireless mesh network. A wireless mesh network may refer to a decentralized wireless network whose nodes (e.g. wireless communication devices) communicate directly in a point-to-point manner without using a central access point, base station or network controller. Wireless mesh networks may include mesh clients, mesh routers, or mesh gateways. In some instances, a wireless mesh network is based on the IEEE 802.11s standard. In some instances, a wireless mesh network is based on Wi-Fi ad hoc or another standardized technology. Examples of commercially-available wireless mesh networks include Wi-Fi systems sold by Google, Eero, and others.

In some example wireless communication networks, each node is connected to one or more other nodes through one or more bi-directional links. Each node can analyze the wireless signals that it receives to identify the perturbation or disturbance on each of the links. The disturbance on each link can be represented as a motion indicator value, for example, as a scalar quantity that can be normalized. The link disturbance values from the nodes in the wireless communication network can be used to determine the probability of motion at the locations associated with the respective node. For example, the probability of motion at each node can be used to tell which node has the highest probability of having motion in its vicinity, and that node can be identified as the node around which the motion occurred. In order to do this, the analysis can be case in a Bayesian estimation framework, for the recursive computation of probabilities. The probabilistic framework offers a number of technical advantages, for example, providing recursive estimation and hence eventual convergence to a correct result, simplistic logic with no conditions for each special situation, performance that is more accurate and robust (e.g., to artifacts) and others.

In addition, physical insights regarding the motion detection system can inform the Bayesian estimation framework that is used to detect the location of motion. For example, the relative magnitude of excitation on a link (between a transmitter node and receiver node) is likely to be greater when the motion that creates the excitation is nearer the receiver node. Accordingly, as an initial probability estimate for where motion occurred, the highest probabilities can be assigned to the receiver nodes on wireless links associated with the highest motion indicator values. This initial probability estimate can be combined with a conditional probability distribution (e.g., based on prior motion data) to produce a recursively refined probability estimate according to a Bayesian framework. As another example, in certain contexts the likelihood of motion transitioning between distinct locations can be higher or lower, relative to the likelihood of motion remaining in a single location. Accordingly, location transition probabilities can be incorporated into the Bayesian framework. For example, a transition probability matrix can be combined with the initial probability estimate and the conditional probability distribution to produce the recursively refined probability estimate according to the Bayesian framework.

FIG. 1 is a diagram showing an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others. In the example shown in FIG. 1, the wireless communication devices 102A, 102B, 102C can be, or may include, standard wireless network components. For example, the wireless communication devices 102A, 102B, 102C may be commercially-available Wi-Fi devices.

In some cases, the wireless communication devices 102A, 102B, 102C may be Wi-Fi access points or another type of wireless access point (WAP). The wireless communication devices 102A, 102B, 102C may be configured to perform one or more operations as described herein that are embedded as instructions (e.g., software or firmware) on the wireless communication devices. In some cases, one or more of the wireless communication devices 102A, 102B, 102C may be nodes of a wireless mesh network, such as, for example, a commercially-available mesh network system (e.g., Google Wi-Fi, Eero Wi-Fi systems, etc.). In some cases, another type of standard or conventional Wi-Fi transceiver device may be used. The wireless communication devices 102A, 102B, 102C may be implemented without Wi-Fi components; for example, other types of wireless protocols for wireless communication, either standard or non-standard, may be used for motion detection.

In the example shown in FIG. 1, the wireless communication devices, e.g., 102A, 102B, transmit wireless signals over a communication channel (e.g., according to a wireless network standard, a motion detection protocol, a presence detection protocol, or other standard or non-standard protocol). For example, the wireless communication devices may generate motion probe signals for transmission to probe a space to detect motion or presence of an object. In some implementations, the motion probe signals may include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, one or more of the wireless communication devices may process motion detection signals, which are signals received based on motion probe signals transmitted through the space. For example, the motion detection signals may be analyzed to detect motion of an object in a space, lack of motion in the space, or the presence or absence of an object in the space when lack of motion is detected, based on changes (or lack thereof) detected in the communication channel.

The wireless communication devices transmitting motion probe signals, e.g. 102A, 102B, may be referred to as source devices. In some cases, wireless communication devices 102A, 102B may broadcast the wireless motion probe signals (e.g., described above). In other cases, the wireless communication devices 102A, 102B may send wireless signals addressed to another wireless communication device 102C and other devices (e.g., a user equipment, a client device, a server, etc.). The wireless communication device 102C as well as the other devices (not shown) may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In some examples, the wireless communication device 102C, which may be referred to as a sensor device, processes the wireless signals received from the wireless communication devices 102A, 102B to detect motion, or lack of motion, of an object in a space accessed by the wireless signals. In some examples, another device or computing system processes the wireless signals received by the wireless communication device 102C from the wireless communication devices 102A, 102B to detect motion, or lack of motion, of an object in a space accessed by the wireless signals. In some cases, the wireless communication device 102C (or another system or device) processes the wireless signals to detect the presence or absence of an object in a space when lack of motion is detected. In some instances, the wireless communication device 102C (or another system or device) may perform one or more operations as described in relation to FIG. 6 or in the example method described method to FIG. 8, or another type of process for detecting motion, detecting lack of motion, or detecting the presence or absence of an object when lack of motion is detected. In other examples, the wireless communication system 100 may be modified, for instance, such that the wireless communication device 102C can transmit wireless signals, e.g. as a source device, and the wireless communication devices 102A, 102B may process the wireless signals, e.g. as sensor devices, from the wireless communication device 102C, to detect motion, lack of motion, or presence when no motion is detected. That is, each of the wireless communication devices 102A, 102B, 102C, may be configured, in some cases, as a source device, a sensor device, or both.

The wireless signals used for motion and/or presence detection can include, for example, a beacon signal (e.g., Bluetooth Beacons, Wi-Fi Beacons, other wireless beacon signals), pilot signals (e.g., pilot signals used for channel sounding, such as in beamforming applications, according to the IEEE 802.11ac-2013 standard), or another standard signal generated for other purposes according to a wireless network standard, or non-standard signals (e.g., random signals, reference signals, etc.) generated for motion and/or presence detection or other purposes. In some cases, the wireless signals for motion and/or presence detection are known to all devices in the network.

In some examples, the wireless signals may propagate through an object (e.g., a wall) before or after interacting with a moving object, which may allow the moving object's movement to be detected without an optical line-of-sight between the moving object and the transmission or receiving hardware. In some cases, the wireless signals, when received by a wireless communication device, e.g. 102C, may indicate lack of motion in a space, for example, that an object is not moving, or no longer moving, in the space. In some cases, the wireless signals, when received by a wireless communication device, e.g. 102C, may indicate the presence of an object in the space when lack of motion is detected. Conversely, the wireless signals may indicate the absence of an object in the space when lack of motion is detected. For example, based on the received wireless signals, the third wireless communication device 102C may generate motion data, presence data, or both. In some instances, the third wireless communication device 102C may communicate the motion detection and/or presence data, to another device or system, such as a security system, that may include a control center for monitoring movement within a space, such as a room, building, outdoor area, etc.

In some implementations, the wireless communication devices 102A, 102B may be configured to transmit motion probe signals (e.g., as described above) on a wireless communication channel separate from wireless network traffic signals (e.g., a frequency channel or coded channel). For example, the modulation applied to the payload of a motion probe signal and the type of data or data structure in the payload may be known by the third wireless communication device 102C, which may reduce the amount of processing that the third wireless communication device 102C performs for motion and presence detection. The header may include additional information such as, for example, an indication of whether motion or lack of motion was detected by another device in the communication system 100, whether a presence of an object was detected by another device in the communication system 100, an indication of the modulation type, an identification of the device transmitting the signal, and so forth.

In the example shown in FIG. 1, the wireless communication system 100 is illustrated as a wireless mesh network, with wireless communication links between each of the respective wireless communication devices 102. In the example shown, the wireless communication links between the third wireless communication device 102C and the first wireless communication device 102A can be used to probe a first motion detection zone 110A, the wireless communication links between the third wireless communication device 102C and the second wireless communication device 102B can be used to probe a second motion detection zone 110B, and the wireless communication links between the first wireless communication device 102A and the second wireless communication device 102B can be used to probe a third motion detection zone 110C. In some instances, each wireless communication device 102 may be configured to detect motion, lack of motion, and/or the presence or absence of an object when no motion is detected, in each of the motion detection zones 110 accessed by that device by processing received signals that are based on wireless signals transmitted by the wireless communication devices 102 through the motion detection zones 110. For example, when a person 106 moves in the first motion detection zone 110A and the third motion detection zone 110C, the wireless communication devices 102 may detect the motion based on signals they receive that are based on wireless signals transmitted through the respective motion detection zones 110. For instance, the first wireless communication device 102A can detect motion of the person in both the first and third motion detection zones 110A, 110C, the second wireless communication device 102B can detect motion of the person 106 in the third motion detection zone 110C, and the third wireless communication device 102C can detect motion of the person 106 in the first motion detection zone 110A. In some cases, lack of motion by the person 106 and, in other cases, the presence of the person 106 when the person 106 is not detected to be moving, may be detected in each of the motion detection zones 110A, 110B, 110C.

In some instances, the motion detection zones 110 can include, for example, air, solid materials, liquids, or another medium through which wireless electromagnetic signals may propagate. In the example shown in FIG. 1, the first motion detection zone 110A provides a wireless communication channel between the first wireless communication device 102A and the third wireless communication device 102C, the second motion detection zone 110B provides a wireless communication channel between the second wireless communication device 102B and the third wireless communication device 102C, and the third motion detection zone 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement or lack of movement of an object in a space, and may be used to detect the presence (or absence) of an object in the space when there is a lack of movement detected. The objects can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may trigger further analysis to determine the presence or absence of an object when motion of the object is not detected.

In some implementations, the wireless communication system 100 may be, or may include, a motion detection system. The motion detection system may include one or more of the wireless communication devices 102A, 102B, 102C and possibly other components. One or more wireless communication devices 102A, 102B, 102C in the motion detection system may be configured for motion detection, presence detection, or both. The motion detection system may include a database that stores signals. One of the wireless communication devices 102A, 102B, 102C of the motion detection system may operate as a central hub or server for processing received signals and other information to detect motion and/or presence. The storage of data—e.g., in the database, and/or the determination of motion, lack of motion (e.g., a steady state), or presence detection—may be performed by a wireless communication device 102, or in some cases, may be performed by another device in the wireless communication network or in the cloud (e.g., by one or more remote devices).

Figure 2A:
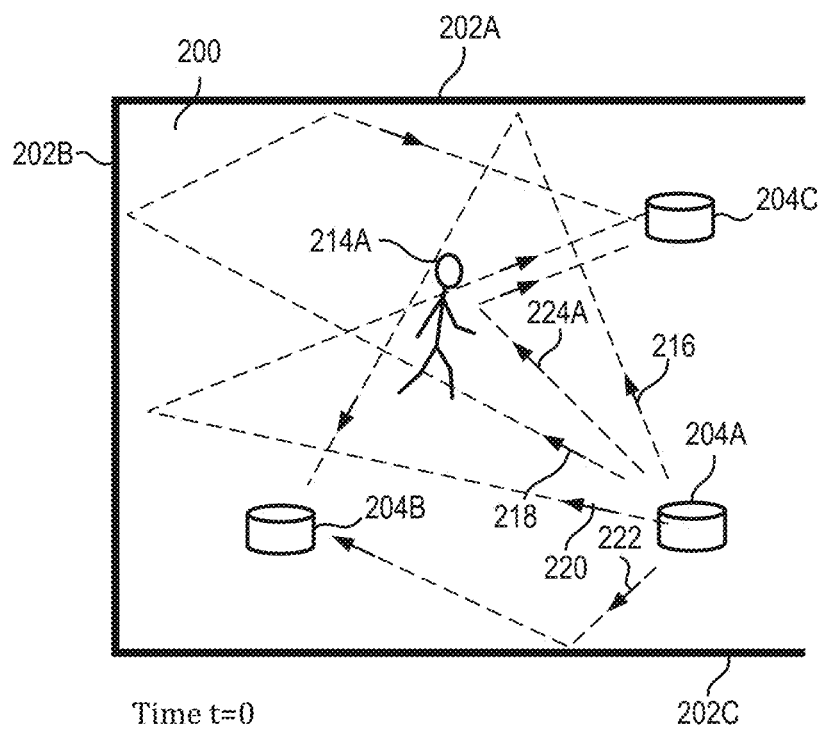
FIGS. 2A and 2B are diagrams showing example wireless signals communicated between wireless communication devices in a motion detection system.
Figure 2B:
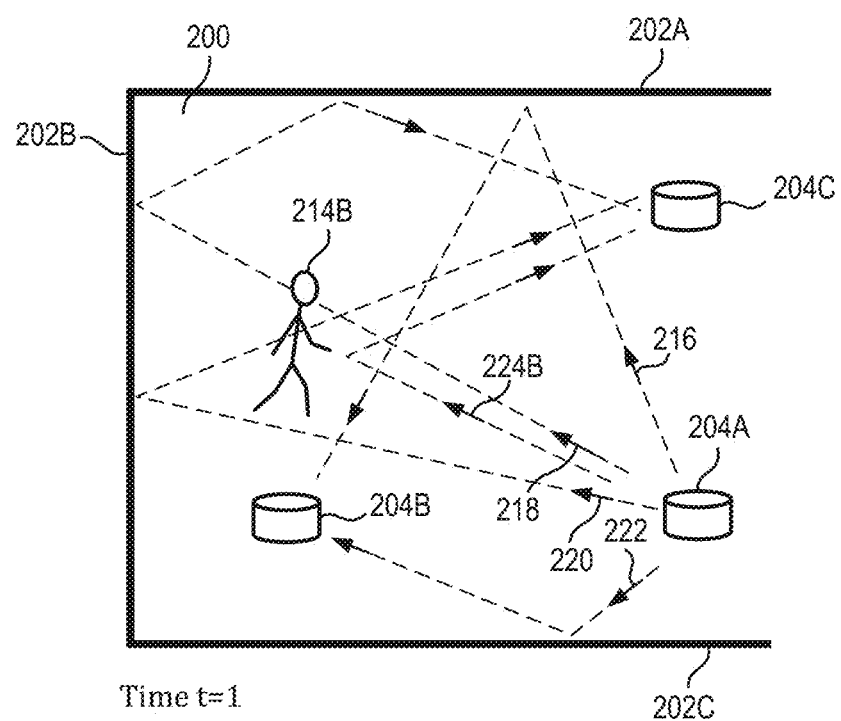

FIGS. 2A and 2B are diagrams showing example wireless signals communicated between wireless communication devices 204A, 204B, 204C in a motion detection system. The wireless communication devices 204A, 204B, 204C may be, for example, the wireless communication devices 102A, 102B, 102C shown in FIG. 1, or may be other types of wireless communication devices. Examples of wireless communication devices include wireless mesh devices, stationary wireless client devices, mobile wireless client devices, and so forth.

In some cases, a combination of one or more of the wireless communication devices 204A, 204B, 204C can form, or may be part of, a dedicated motion detection system. For example, as part of the dedicated motion detection system, one or more of the wireless communication devices 204A, 204B, 204C may be configured for motion detection, presence detection, or both, in the motion detection system. In some cases, a combination of one or more of the wireless communication devices 204A, 204B, 204C may be, or may be part of, an ad hoc motion detection system that also performs other types of functions.

The example wireless communication devices 204A, 204B, 204C may transmit and/or receive wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.), e.g., as a source device. The second and third wireless communication devices 204B, 204C are operable to receive signals based on the motion probe signals transmitted by the wireless communication device 204A, e.g., as a sensor device. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard). The wireless communication devices 204B, 204C each have an interface, modem, processor, or other component that is configured to process received motion detection signals to detect motion or lack of motion, of an object in the space 200. In some instances, the wireless communication devices 204B, 204C may each have an interface, modem, processor, or other component that is configured to detect the presence or absence of an object in the space 200 when lack of motion is detected, for example, whether the space is occupied or non-occupied.

As shown, an object is in a first position 214A at an initial time t=0 in FIG. 2A, and the object has moved to a second position 214B at subsequent time t=1 in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. For this example, the representation of the object's 214 movement is merely indicative that the object's location changed within the space 200 between time t=0 and time t=1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t=0 in FIG. 2A and time t=1 in FIG. 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A may be configured as a source device and may repeatedly transmit a wireless signal. For example, FIG. 2A shows the wireless signal being transmitted from the first wireless communication device 204A during a first time t=0. The transmitted signal may be transmitted continuously, periodically, at random or intermittent times or the like, or a combination thereof. For example, the transmitted signal may be transmitted one or more times between time t=0 and a subsequent time t=1 illustrated in FIG. 2B, or any other subsequent time. The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—does not change. Lack of change in the received signal (e.g., a steady state) may indicate lack of movement in the space 200.

Mathematically, a transmitted signal f(t) transmitted from the first wireless communication device 204A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} \left( \alpha_{n,k} e^{j\phi_{n,k}} \right) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}} \quad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response (or "steady state"), for example, when no change or only small changes are detected in the channel response (or the complex value $Y_n$), indicates lack of movement. Thus, in some implementations, the complex value $Y_n$ for each of multiple devices in a wireless mesh network can be analyzed to detect whether motion has occurred, or whether there is lack of motion, in a space traversed by the transmitted signals f(t). In some cases, when lack of movement is detected, further analysis may be performed on the channel response to determine if an object is present in the space, but not moving.

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to the propagation characteristics of a channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some instances, the channel information (e.g., channel response information or beamforming state information, as described above) derived from wireless signals can be used to compute motion indicator values. For example, a set of motion indicator values for a given time frame may represent the levels of disturbance detected on the respective wireless links that communicated the wireless signals during the time frame. In some cases, the channel information can be filtered or otherwise modified, for instance, to reduce the effects of noise and interference on the motion indicator values. In some contexts, a higher magnitude motion indicator value may represent a higher level of disturbance, while a lower magnitude motion indicator value may represent a relatively lower level of disturbance. For instance, each motion indicator value can be an individual scalar quantity, and the motion indicator values can be normalized (e.g., to unity or otherwise).

In some cases, the motion indicator values associated with a time frame can be used collectively to make an overall determination, for example, whether motion occurred in the space during the time frame, where motion occurred in the space during the time frame, etc. For instance, a motion consensus value for a time frame may indicate the overall determination of whether motion occurred in the space based on all (or a subset) of motion indicator values for the time frame. In some cases, a more accurate, reliable or robust determination can be made by analyzing multiple motion indicator values for a time frame collectively. And in some cases, data sets can be updated recursively to further improve the accuracy, for example, of location determinations. For instance, the motion indicator values for each sequential time frame can be used to recursively update data sets representing the conditional probability of detecting motion at distinct locations in the space, and the recursively updated data sets can be used to make an overall determination of where motion occurred during a subsequent time frame.

Figure 3:
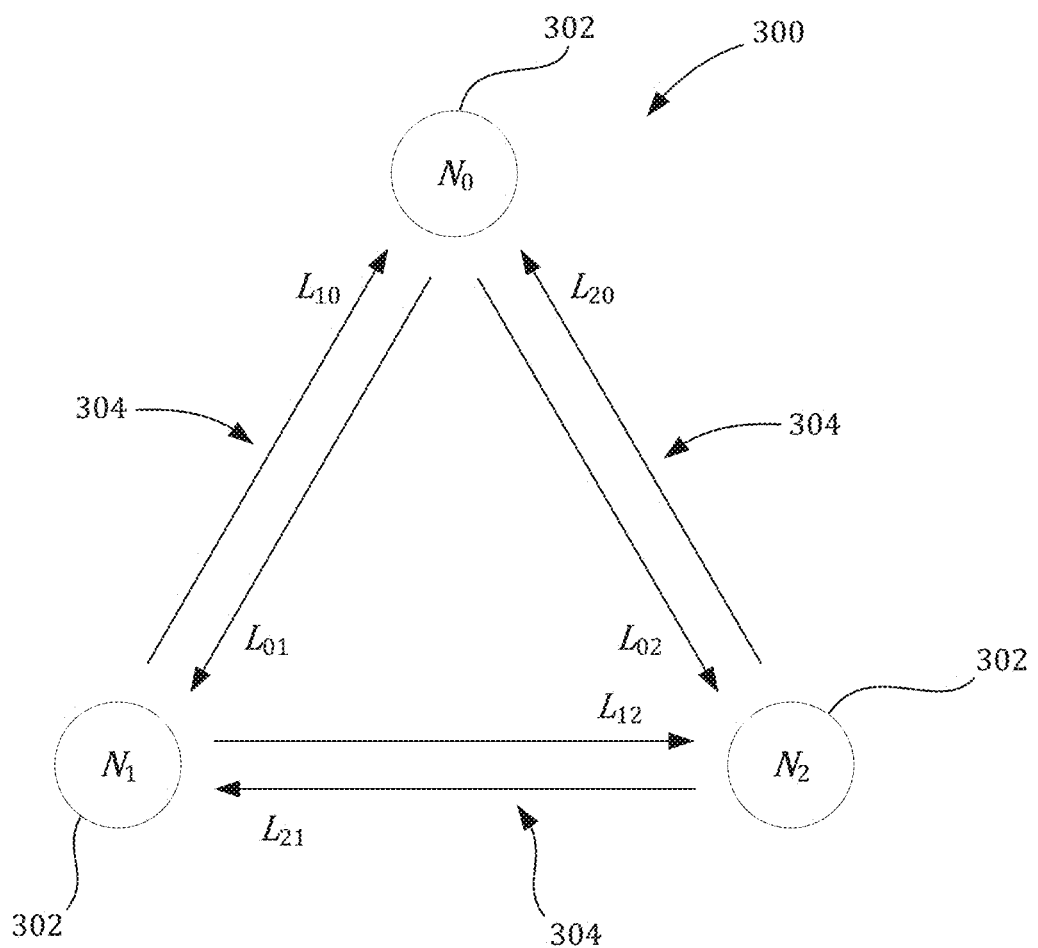
FIG. 3 is a schematic diagram of an example wireless communication network that includes a plurality of wireless nodes.

FIG. 3 is a schematic diagram of an example wireless communication network 300 that includes a plurality of wireless nodes 302. The plurality of wireless nodes 302 may be analogous to the wireless communication devices 102, 204 of FIGS. 1 and 2A-2B, respectively. In FIG. 3, three wireless nodes 302 are depicted, labeled $N_0$, $N_1$, and $N_2$. However, other numbers of wireless nodes 302 are possible in the wireless communication network 300. Moreover, other types of nodes are possible. For example, the wireless communication network 300 may include one or more network servers, network routers, network switches, network repeaters, or other type of networking or computing equipment.

The wireless communication network 300 includes wireless communication channels 304 communicatively coupling respective pairs of wireless nodes 302. Such communicative coupling may allow an exchange of wireless signals between wireless nodes 302 over a time frame. In particular, the wireless communication channels 304 allow bi-directional communication between the respective pairs of wireless nodes 302. Such communication may occur along two directions simultaneously (e.g., full duplex) or along only one direction at a time (e.g., half duplex). In some instances, such as shown in FIG. 3, the wireless communication channels 304 communicatively couple every pair of the plurality of wireless nodes 302. In other instances, one or more pairs of wireless nodes 302 may lack a corresponding wireless communication channel 304.

Each wireless communication channel 304 includes two or more wireless links, including at least one for each direction in the bi-directional communication. In FIG. 3, an arrow represents each individual wireless link. The arrow is labeled $L_{ij}$ where a first subscript, i, indicates a transmitting wireless node and a second subscript, j, indicates a receiving wireless node. For example, wireless nodes $N_0$ and $N_1$ are communicatively coupled by two wireless links that are indicated in FIG. 3 by two arrows, $L_{01}$ and $L_{10}$. Wireless link $L_{01}$ corresponds to wireless communication along a first direction from $N_0$ to $N_1$ and wireless link $L_{10}$ corresponds wireless communication along a second, opposing direction from $N_1$ to $N_0$.

In some implementations, the wireless communication network 300 obtains motion data associated with a first time frame, which may include the processes of motion detection described in relation to FIGS. 2A-2B. The motion data includes a set of motion indicator values indicating motion detected from wireless signals exchanged during the first time frame. The motion may be detected on a plurality of wireless links (e.g., the wireless links $L_{01}$, $L_{10}$, $L_{02}$, $L_{20}$, $L_{12}$, and $L_{21}$ of FIG. 3) in a wireless communication network (e.g., the wireless communication network 300). Each of the wireless links can be defined between a respective pair of wireless communication devices in the wireless communication network (e.g., pair combinations of wireless nodes $N_0$, $N_1$, and $N_2$). Moreover, each of the motion indicator values is associated with a respective wireless link.

In some variations, the wireless communication network 300 may include a data processing apparatus that executes program instructions (e.g., a network server, a wireless communication device, a network router, etc.). The program instructions may cause the data processing apparatus to assign a unique node identifier to each of the wireless nodes 302 in the wireless communication network 300. The unique node identifier may be mapped to a media access control (MAC) address value, which corresponds to a MAC address (or portion thereof) associated with a wireless node. For example, the wireless nodes $N_0$, $N_1$, and $N_2$ of FIG. 3 may be associated with a six-character portion of their respective MAC addresses, which is then mapped to a unique node identifier:

{$N_0$, $N_1$, $N_2$}→{e565c0, e56783, e57349}→{0, 1, 2}

Here, the MAC address values of e565c0, e56783, and e57349 are mapped to respective unique node identifiers 0, 1, and 2. The program instructions may also cause the data processing apparatus to associate the wireless links with their respective pairs of wireless nodes via corresponding pairs of MAC address values. The MAC address values may then be mapped to a unique link identifier to form a link table. For example, the wireless links $L_{01}$, $L_{10}$, $L_{02}$, $L_{20}$, $L_{12}$, and $L_{21}$ of FIG. 3 may be mapped to unique link identifiers according to:

$$\begin{Bmatrix} L_{01} \\ L_{02} \\ L_{10} \\ L_{12} \\ L_{20} \\ L_{21} \end{Bmatrix} \rightarrow \begin{Bmatrix} e565c0 - e56783 \\ e565c0 - e57349 \\ e56783 - e565c0 \\ e56783 - e57349 \\ e57349 - e565c0 \\ e57349 - e56783 \end{Bmatrix} \rightarrow \begin{Bmatrix} 0 \\ 1 \\ 2 \\ 3 \\ 4 \\ 5 \end{Bmatrix}$$

The MAC address values may be ordered, from left to right, to indicate respective pairs of transmitting and receiving wireless nodes in a wireless link. In particular, the left MAC address value may correspond to a transmitting wireless node and the right MAC address value may correspond to a receiving wireless node. Such mappings of unique node and link identifiers may aid the data processing apparatus in performing operations, such as searching, sorting, and matrix manipulation, during processes of motion detection.

The program instructions may additionally cause the data processing apparatus to poll the wireless links (or wireless nodes 302) to obtain motion indicator values for each wireless link in the plurality of wireless links. For example, the wireless links of the wireless communication network 300 of FIG. 3 may report motion indicator values according to a data structure, such as shown below:

$$\begin{Bmatrix} 0 & 0.000000 \\ 1 & 0.022051 \\ 2 & 0.000000 \\ 3 & 0.000000 \\ 4 & 0.000000 \\ 5 & 0.000000 \end{Bmatrix}$$

In the data structure, the first column corresponds to the unique link identifiers of the wireless links and the second column of the data structure corresponds to their respective motion indicator values. The data structure may be an array, as shown above, or some other type of data structure (e.g., a vector). Although data structure is presented as having six significant digits for each motion indicator value, other numbers of significant digits are possible for the motion indicator values (e.g., 3, 5, 9, etc.).

The program instructions may further cause the data processing apparatus to identify a first wireless link, of the plurality of wireless links, based on a magnitude of a motion indicator value associated with the first wireless link relative to the other motion indicator values in the set of motion indicator values. To do so, the data processing apparatus may sort or filter through the motion indicator values to identify the first wireless link. For example, the data processing apparatus may sort the data structure according to magnitude, thereby determining a highest motion indicator value. In the data structure, the highest motion indicator value (i.e., 0.022051) corresponds to unique link identifier 1, which maps to wireless link e565c0–e57349 (or $L_{02}$ in FIG. 3). The data processing apparatus may then identify wireless link 1 as the first wireless link.

In some implementations, a node in the wireless communication network 300 generates a first probability vector based on a predetermined map and the first wireless link. The first probability vector includes first values assigned to the respective wireless communication devices in the wireless communication network 300. The first values represent first probabilities of motion at the respective wireless communication devices during the first time frame.

In some variations, the first probability vector is represented by a probability vector, $P(L_j|N_i)$ that includes probability values (or first values) generated from the probability map. The probability values correspond to probabilities that a wireless link, $L_j$, exhibits link activity given motion at a wireless node, $N_i$. For example, the data processing apparatus may identify wireless link 1 as the first wireless link. As such, $P(L_j|N_i)=P(1|N_i)=\{P(1|0), P(1|1), P(1|2)\}$. Here, $P(1|0)$ corresponds to the probability that motion at wireless node 0 induces link activity along wireless link 1, $P(1|1)$ corresponds to the probability that motion at wireless node 1 induces link activity along wireless link 1, and $P(1|2)$ corresponds to the probability that motion at wireless node 2 induces link activity along wireless link 1. These probability values can be generated using map values from the probability map. The probability map may include map values that are based on a characteristic of a wireless communication device.

Figure 4:
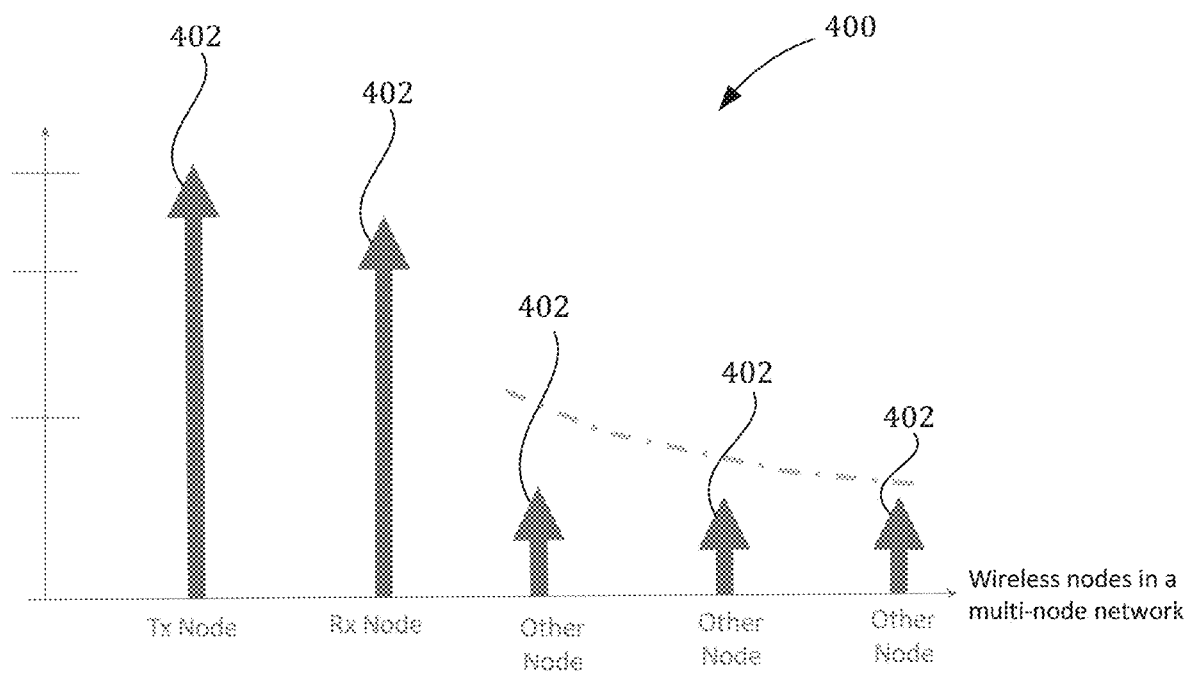
FIG. 4 is a schematic graph of an example probability map having map values that are based on a wireless node's status as a transmitting wireless node (Tx), a receiving wireless node (Rx), or other wireless node.

FIG. 4 is a schematic graph of an example probability map 400 having map values 402 that are based on a wireless node's status as a transmitting wireless node (Tx), a receiving wireless node (Rx), or other wireless node. In FIG. 4, the map values 402 are highest for the transmitting wireless node (Tx) in a wireless link, second-highest for the receiving wireless node (Rx) in the wireless link, and lowest for wireless nodes not associated with the wireless link. In view of these map values 402, the example probability map 400 may reflect a multi-path propagation environment that is richer around a transmitting wireless node than a receiving wireless node.

Figure 5:
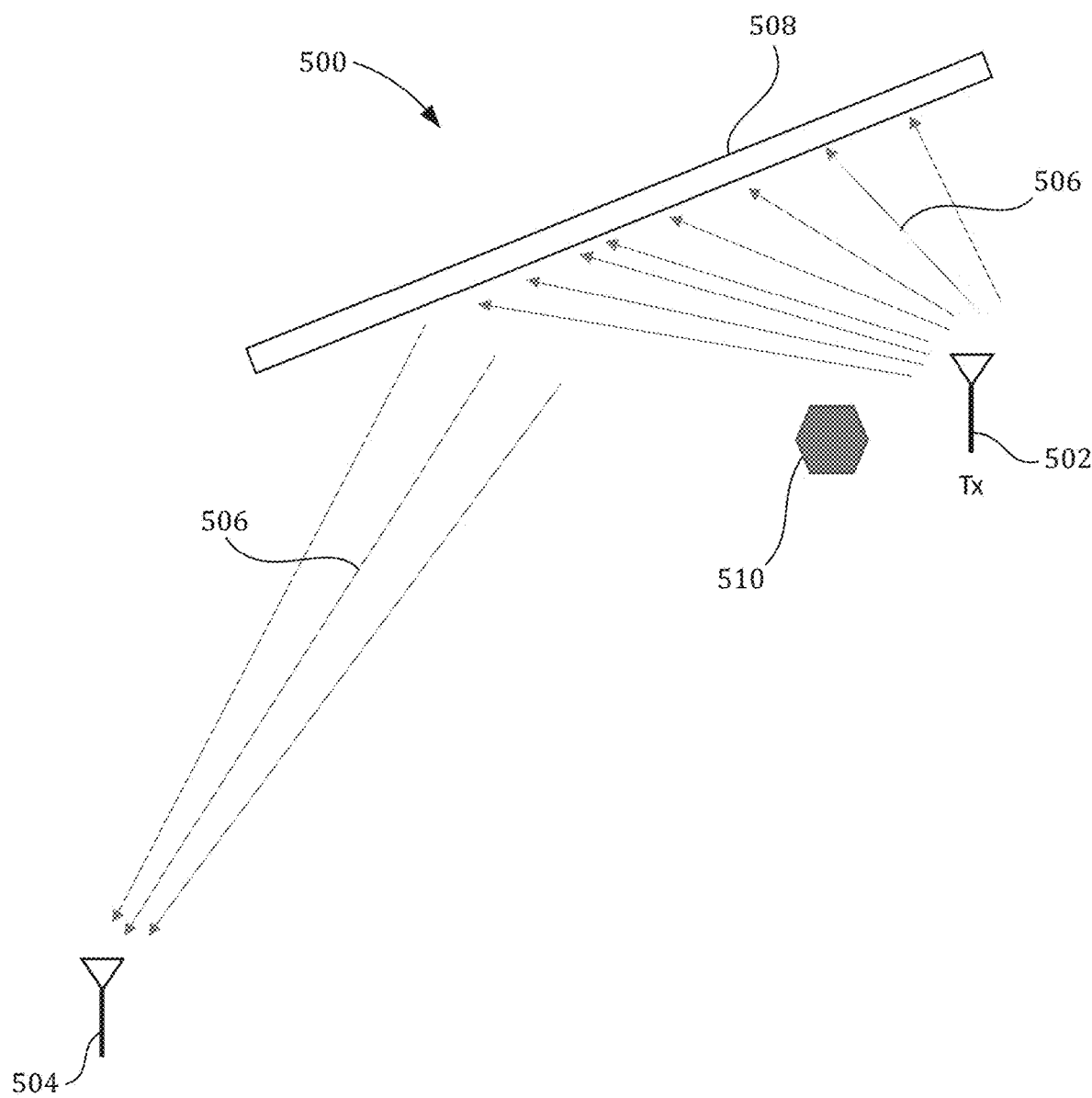
FIG. 5 is a schematic diagram of an example multi-path propagation environment between a transmitting wireless node and a receiving wireless node.

FIG. 5 is a schematic diagram of an example multi-path propagation environment between a transmitting wireless node 502 and a receiving wireless node 504. Wireless communication between the nodes 502, 504 is represented by arrows 506, which are denser around the transmitting wireless node 502 than the receiving wireless node 504. The arrows 506 indicate a plurality of possible propagation paths for electromagnetic radiation traveling from the transmitting wireless node 502 to the receiving wireless node 504. During propagation, the electromagnetic radiation may encounter objects, such as a wall 508 and a moving body 510. Such encounters may include interactions with the objects, including absorption, reflection, scattering, and so forth.

If the moving body 510 enters a region proximate the transmitting wireless node 502, the moving body 510 may have an increased interaction with the electromagnetic radiation due to a denser distribution of propagation paths. Conversely, if the moving body 510 enters a region proximate the receiving wireless node 504, the moving body 510 may have a decreased interaction with the electromagnetic radiation due to a less-dense distribution of propagation paths. As such, motion proximate the transmitting wireless node 502 may have a greater probability to induce link activity along a wireless link communicatively coupling the nodes 502, 504 than motion proximate the receiving wireless node 504. A probability map—such as the probability map 400 of FIG. 4—can reflect this bias by using map values that favor the transmitting wireless node 502.

Although FIGS. 4 and 5 present the probability map in the context of transmitting and receiving wireless nodes, map values may be based on other characteristics of the wireless communication devices. Such characteristics include a location of a wireless node, a wireless signal frequency of a wireless link, a distance between wireless nodes, a time of day, and so forth. In some instances, the probability map may be constructed using a priori information about a wireless node's locality. For example, a received signal strength indicator (RSSI) of a wireless link can be used as a proxy for how far apart two wireless nodes of interest are. If a wireless node is very from both the transmitting and receiving node of the wireless link far—as represented by a weak RSSI—the wireless node can be assigned a very low probability based on the static channel conditions.

In some cases, the first probability vector is generated based on the predetermined map and the identified first wireless link. For example, if the map values 402 of FIG. 4 are 1.0, 0.9, and 0.2 the transmitting wireless node (Tx), the receiving wireless node (Rx), and all other wireless nodes, respectively, the data processing apparatus may output $P(1|N_i)=\{1.0, 0.2, 0.9\}$. In doing so, the data processing apparatus identifies wireless node 0 as the transmitting wireless node and assigns P(1|0) a value of 1.0 based on a corresponding map value in the probability map 400. Analogous mapping considerations result in the data processing apparatus assigning P(1|2) a value of 0.2 and P(1|2) a value of 0.9. Other values may be used.

In some implementations, the node in the wireless communication network 300 obtains a second probability vector generated from motion data associated with a prior time frame. The second probability vector includes second values assigned to the respective wireless communication devices. The second values represent prior probabilities of motion at the respective wireless communication devices during the prior time frame.

In some variations, the second probability vector is represented by a probability vector, $P(N_i)$, that includes probability values (or second values) representing a probability of motion at a wireless node, $N_i$. The probability of motion at wireless node, $N_i$, for $P(N_i)$ is independent of link activity along any of wireless links, $L_j$, and may also be independent of other factors. For example, the program instructions may cause the data processing apparatus to define $P(N_i)$ according to $P(N_i)=\{P(0), P(1), P(2)\}$. Here, $P(N_i)$ has probability values of P(0), P(1), and P(2), which correspond to the probability of motion at (or proximate to) wireless nodes 0, 1, and 2, respectively.

During operation, the program instructions may also cause the data processing apparatus to obtain $P(N_i)$ from the prior time frame. However, under certain conditions, the data processing apparatus may be unable to do so or lack sufficient data for completing such instructions (e.g., as a result of a component malfunction, during first power-up, etc.). Under such conditions, the data processing apparatus may set the probability values to one or more predetermined values (e.g., to initial values, reset values, etc.). For example, during first power-up, the program instructions may cause the data processing apparatus to initialize P(0), P(1), and P(2) to equal probability values, e.g., $P(N_i)=\{0.333, 0.333, 0.333\}$. Although $P(N_i)$ is presented as having three significant digits for each probability value, other numbers of significant digits are possible for the probability values (e.g., 2, 4, 6, 9 etc.).

In some implementations, a node in the wireless communication network 300 may determine a location of the motion detected from the wireless signals exchanged during the first time frame. The location of the motion can be determined based on the second probability vector and the first probability vector.

In further implementations, a node in the wireless communication network 300 may generate a third probability vector by combining the second values from the second probability vector with the first values from the first probability vector. The third probability vector may include third values assigned to the respective wireless communication devices. The third values represent current probabilities of motion at the respective wireless communication devices during the first time frame. In these implementations, the node in the wireless communication network 300 identifies a first wireless communication device associated with the highest of the third values. Moreover, determining the location of the motion includes identifying a location (e.g., a room, zone, floor, quadrant, etc.) associated with the wireless communication device as the location of the motion detected during the first time frame.

In some variations, the third probability vector is represented by $P(N_i|L_j)$, where $N_i$ corresponds to the unique node identifier and $L_j$ corresponds to the unique link identifier. The third probability vector, $P(N_i|L_j)$, includes third values that represent a probability of motion at wireless node, $N_i$, given link activity along wireless link, $L_j$. For example, if wireless link 1 in the wireless communication network 300 of FIG. 3 is identified as the first wireless link, the respective third values may then be represented by P(0|1), P(1|1), and P(2|1), where $P(N_i|1)=\{P(0|1), P(1|1), P(2|1)\}$. Here, P(0|1) corresponds to a probability that link activity along wireless link 1 results from motion at wireless node 0, P(1|1) corresponds to a probability that link activity along wireless link 1 results from motion at wireless node 1, and P(2|1) corresponds to a probability that link activity along wireless link 1 results from motion at wireless node 2.

The third probability vector, $P(N_i|L_j)$, may be determined according to Eq. (1):

$$P(N_i | L_j) = \frac{P(L_j | N_i) \cdot P(N_i)}{\sum_i P(L_j | N_i) P(N_i)} \qquad (1)$$

where $P(L_j|N_i)$ and $P(N_i)$ are as described above. Eq. (1) may allow the wireless communication network 300 (or data processing apparatus) to determine the location of detected motion using Bayesian statistics. For example, if in the wireless communication network 300 of FIG. 3, wireless link 1 is the first wireless link and $P(1|N_i)=\{1, 0.2, 0.9\}$, the program instructions may then cause the data processing apparatus to calculate the third probability vector, $P(N_i|1)$, according to:

$$P(N_i | 1) = \frac{P(1 | N_i) \cdot P(N_i)}{\sum_i P(1 | N_i) P(N_i)} = \frac{\{1.0 \cdot 0.333, 0.2 \cdot 0.333, 0.9 \cdot 0.333\}}{(1.0 \cdot 0.333) + (0.2 \cdot 0.333) + (0.9 \cdot 0.333)}$$

Such calculation results in $P(N_i|1)=\{0.476, 0.095, 0.429\}$, with the third values summing to unity, i.e., 0.476+0.095+0.429=1. $P(N_i|1)$ may therefore represent a probability distribution normalized to unity. In $P(N_i|1)$, P(0|1) corresponds to the largest of the third values, indicating that motion detected by the wireless communication network 300 along wireless link 1 has the highest probability of being located at (or proximate to) wireless node 0. Based on this value of P(0|1), the program instructions may cause the data processing apparatus to look up the MAC address value of wireless node 0, and when found, output the result (e.g., output e565c0).

In some implementations, a node in the wireless communication network 300 performs an iterative process for sequential time frames. For example, the node may repeat the operations, over multiple iterations for respective time frames, of obtaining motion data, identifying the first wireless link, generating the first probability vector, obtaining the second probability vector, generating the third probability vector, identifying the wireless communication device, and determining the location of the motion for each sequential time frame. In these implementations, the third probability vector of a previous iteration serves as the second probably vector of a present iteration, thereby allowing the third probability vector to be recursively updated.

For example, in variations where the third probability vector is represented by $P(N_i|L_j)$ and the second probability vector is represented by $P(N_i)$, the third probability vector from the prior time frame may serve as the second probability vector from the first time frame to generate the first probability vector, e.g., $P(N_i|L_j)$ from the prior time frame substitutes for $P(N_i)$ in the first time frame in Eq. (1). As such, the data processing apparatus may nest the calculation of $P(N_i|L_j)$ from a prior time frame within a calculation of $P(N_i|L_j)$ of a present timeframe to recursively update the probabilities of motion at each wireless node 302 over multiple calculation cycles. The probabilities for motion at (or proximate to) each wireless communication device (or wireless node 302) may therefore be recursively updated each cycle using Bayesian statistics.

Although the examples presented thus far describe the wireless communication network 300 operating in the context of a single identified wireless link (e.g., the first wireless link), the wireless communication network 300 may determine a location of motion using multiple wireless links. In some implementations, identifying the first wireless link includes identifying a plurality of wireless links based on a magnitude of motion indicator values associated with each wireless link. The magnitude of motion may be relative to the other motion indicator values in the set of motion indicator values (or link table). In these implementations, generating the first probability vector includes generating a first probability vector for each of the plurality of identified wireless links based on the predetermined map and each respective wireless link In some implementations, the plurality of identified wireless links includes the first wireless link and a second wireless link. The magnitude of the motion indicator associated with the first wireless link may be a highest motion indicator value, and a magnitude of the motion indicator value associated with the second wireless link may be a second-highest motion indicator value.

For example, in the wireless communication network of FIG. 3, a node in the wireless communication network 300 may poll the wireless links (or wireless nodes 302) to obtain motion indicator values for each wireless link. The motion indicator values may correspond to the first time frame or another time frame (e.g., subsequent to the first time frame of the previous example). The wireless links of the wireless communication network 300 of FIG. 3 may report motion indicator values in a data structure, as shown below:

$$\begin{Bmatrix} 0 & 0.000000 \\ 1 & 0.184735 \\ 2 & 0.202763 \\ 3 & 0.000000 \\ 4 & 0.094783 \\ 5 & 0.000000 \end{Bmatrix}$$

The program instructions may also cause the data processing apparatus to sort the data structure according to magnitude to determine the two highest motion indicator values. In the data structure, the two highest motion indicator values correspond to wireless links 1 and 2 (or $L_{02}$ and $L_{10}$ in FIG. 3). The data processing apparatus may normalize the two highest motion indicator values to unity, thereby producing a second data structure:

$$\begin{Bmatrix} 1 & 0.184735 \\ 2 & 0.202763 \end{Bmatrix} \rightarrow$$

$$\begin{Bmatrix} 1 & 0.184735/(0.184735+0.202763) \\ 2 & 0.202763/(0.184735+0.202763) \end{Bmatrix} \rightarrow \begin{Bmatrix} 1 & 0.477 \\ 2 & 0.523 \end{Bmatrix}$$

In such normalization, each of the motion indicator values is divided by a sum of all motion indicator values. The motion indicator values so-normalized sum to unity, e.g., 0.477+0.523=1. The normalized motion indicator values may be used to generate scaled third probability vectors of each of the plurality of identified wireless links, as will be described below. Although the second data structure is presented as having three significant digits for each normalized motion indicator value, other numbers of significant digits are possible for the motion indicator values (e.g., 2, 4, 6, 9, etc.).

In some implementations, a node in the wireless communication network 300 generates a third probability vector by combining the second values from the second probability vector with the first values from each generated first probability vector. The third probability vector may include third values assigned to the respective wireless communication devices. The third values represent current probabilities of motion at the respective wireless communication devices during the first time frame. In executing the program instructions, the wireless communication network 300 may also identify a first wireless communication device associated with the highest of the third values. Moreover, the wireless communication network 300 may determine the location the motion by identifying a location associated with the wireless communication device as the location of the motion detected during the first time frame.

In some variations, the third probability vector is represented by $P(N_i|L_j)$ and Eq. (1). Program instructions may then cause the data processing apparatus to generate a third probability vector for each identified wireless link. The third probability vectors may then be scaled and summed to generate an effective third probability vector, $P_e(N_i|L_j)$, which serves as the third probability vector for the first time frame. The effective third probability vector may be determined according to Eq. (2):

$$P_e(N_i|L_j) = \sum_{j=id.} c(L_j) P(N_i|L_j) \quad (2)$$

Here, $c(L_j)$ corresponds to a scaling constant for an identified wireless link, $L_j$, and the summation over j corresponds to all identified wireless links (id.). The scaling constant, $c(L_j)$, is generated from the normalized motion indicator value of a respective identified wireless link, $L_j$, such as that stored in the second data structure.

For example, the second data structure described above includes a normalized motion indicator value for each of identified wireless links 1 and 2. The corresponding scaling constants are thus c(1)=0.477 for identified wireless link 1 and c(2)=0.523 for identified wireless link 2. Moreover, if the probability map described in the previous example is applicable to the time frame of the second data structure, $P(1|N_i)=\{1.0, 0.2, 0.9\}$ for identified wireless link 1 and $P(2|N_i)=\{0.9, 1.0, 0.2\}$ for identified wireless link 2. Furthermore, if the present example corresponds to a time frame after the previous example, $P(N_i|1)$ from the previous example may serve as $P(N_i)$ of the present example, e.g., $P(N_i)=P(N_i|1)=\{0.476, 0.095, 0.429\}$.

In view of these example parameters, the program instructions may cause the data processing apparatus to generate the third probability vector, $P(N_i|1)$, according to:

$$P(N_i \mid 1) = c(L_j) \frac{P(1 \mid N_i) \cdot P(N_i)}{\sum_i P(1 \mid N_i) P(N_i)} = (0.477) \frac{\{1.0 \cdot 0.476, 0.2 \cdot 0.095, 0.9 \cdot 0.429\}}{(1.0 \cdot 0.476) + (0.2 \cdot 0.095) + (0.9 \cdot 0.429)}$$

which results in $P(N_i|1)=\{0.540, 0.022, 0.438\}$. Similarly, the program instructions may also cause the data processing apparatus to generate the third probability vector, $P(N_i|2)$, according to:

$$P(N_i \mid 2) = c(L_j) \frac{P(2 \mid N_i) \cdot P(N_i)}{\sum_i P(2 \mid N_i) P(N_i)} = (0.523) \frac{\{0.9 \cdot 0.476, 1.0 \cdot 0.095, 0.2 \cdot 0.429\}}{(0.9 \cdot 0.476) + (1.0 \cdot 0.095) + (0.2 \cdot 0.429)}$$

which results in $P(N_i|2)=\{0.703, 0.156, 0.141\}$. In each of $P(N_i|1)$ and $P(N_i|2)$, the probability value (or third value) for wireless node 0 is highest. Moreover, relative to $P(N_i|1)$ from the previous example, the probability values of wireless node 0 are higher. Such increases are consistent with the predetermined map continuing to favor wireless node 0 in present time frame.

The program instructions may additionally cause the data processing apparatus to generate an effective third probability vector by summing the third probability vectors for wireless node 1 and wireless node 2. As such, the data processing apparatus may generate $P_e(N_i|1, 2)$ according to $P(N_i|1)+P(N_i|2)=\{0.626, 0.092, 0.282\}$. In generating the effective third probability vector, the data processing apparatus distributes the third probability vectors for each identified wireless link more finely in the final output. The effective third probability vector, $P_e(N_i|1, 2)$, indicates that motion detected by the wireless communication network 300 has the highest probability of being located at (or proximate to) wireless node 0, as shown by $P_e(0|1, 2)=0.626$. Moreover, relative to the third probability vector from the previous time frame, the distribution of effective third values is more uneven and strongly favors wireless node 0, e.g., compare the newly-generated $\{0.626, 0.092, 0.282\}$ to the previously-generated $\{0.476, 0.095, 0.429\}$.

Figure 6:
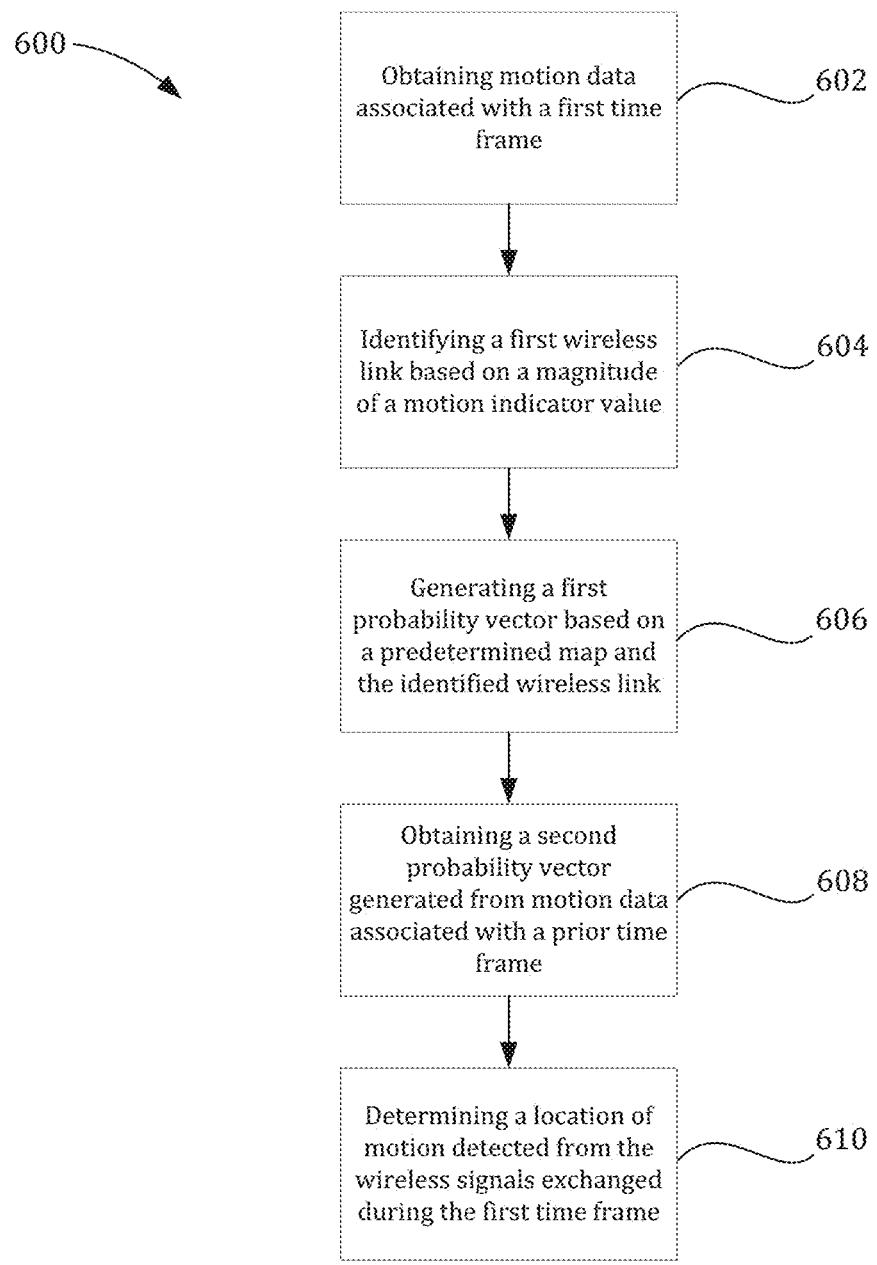
FIG. 6 is a flowchart of an example process for determining a location of motion detected by wireless communication devices in a wireless communication network.

FIG. 6 is a flowchart showing an example process 600 for determining a location of motion detected by wireless communication devices in a wireless communication network. Operations in the example process 600 may be performed by a data processing apparatus (e.g., a processor in a wireless communication device 102 in FIG. 1A) to detect a location of motion based on signals received at wireless communication devices. The example process 600 may be performed by another type of device. For instance, operations of the process 600 may be performed by a system other than a wireless communication device (e.g., a computer system connected to the wireless communication system 100 of FIG. 1A that aggregates and analyzes signals received by the wireless communication devices 102).

The example process 600 may include additional or different operations, and the operations may be performed in the order shown or in another order. In some cases, one or more of the operations shown in FIG. 6 are implemented as processes that include multiple operations, sub-processes or other types of routines. In some cases, operations can be combined, performed in another order, performed in parallel, iterated, or otherwise repeated or performed another manner.

The example process 600 includes obtaining motion data associated with a first time frame, as shown by operation 602. The motion data includes a set of motion indicator values that indicate motion detected from wireless signals exchanged during the first time frame on a plurality of wireless links in the wireless communication network. Each of the wireless links is defined between a respective pair of wireless communication devices in the wireless communication network, and each of the motion indicator values is associated with a respective wireless link.

The example process 600 also includes identifying a first wireless link, of the plurality of wireless links, based on a magnitude of a motion indicator value associated with the first wireless link, as shown by operation 604. The magnitude is analyzed relative to the other motion indicator values in the set of motion indicator values. The example process 600 additionally includes generating a first probability vector based on a predetermined map and the identified first wireless link, as shown by operation 606. The first probability vector includes first values assigned to the respective wireless communication devices. The first values represent first probabilities of motion at the respective wireless communication devices during the first time frame.

The example process 600 yet also includes obtaining a second probability vector generated from motion data associated with a prior time frame, as shown by operation 608. The second probability vector includes second values assigned to the respective wireless communication devices. The second values representing prior probabilities of motion at the respective wireless communication devices during the prior time frame. The example process 600 additionally includes determining, by operation of a data processing apparatus, a location of the motion detected from the wireless signals exchanged during the first time frame, as shown by operation 610. The location of the detected motion is determined based on combining the prior probabilities from the second probability vector with the first probabilities from the first probability vector.

Now referring back to FIG. 3, the wireless communication network 300 may determine a location of motion detected by the wireless links by accounting for potential transitions of the motion from one wireless node 302 to another. The potential transitions of the motion may also include those remaining at, or in the immediate vicinity of, a wireless node 302. For example, the wireless communication network 300 may detect motion at or near a first wireless node disposed in a bedroom of a house. The wireless communication network 300 may account for a transition towards a second wireless node in a kitchen of the house if a corresponding time period of detection is during an eating time (e.g., breakfast, lunch, etc.). In another example, if the wireless communication network 300 detects motion at or near the second wireless node during the eating time, wireless communication network 300 may account for the detected motion remaining at or near the second wireless nodes for a future time period within the eating time. Other criteria for the potential transitions are possible.

In some instances, potential transitions of detected motion include criteria of time, location, or both. For example, if a time period of detection occurs during night time, a probability of detected motion transitioning from a bedroom to a washroom may be high. In contrast, a probability of the detected motion transitioning to a front door may be low. A transition probability matrix may be used to represent these differences, which are based predominantly on time: The transition probability matrix may assign a high transition probability to the detected motion transitioning from the bedroom to the washroom while assigning a low transition probability to the detection motion transitioning from the bedroom to the front door. The transition probability matrix may also account for a location of the detected motion. For example, motion detected in a living room may have a similar probability of transitioning to any another wireless node. This similar probability may incorporate considerations of time (e.g., night time, day time, etc.).

Figure 7:
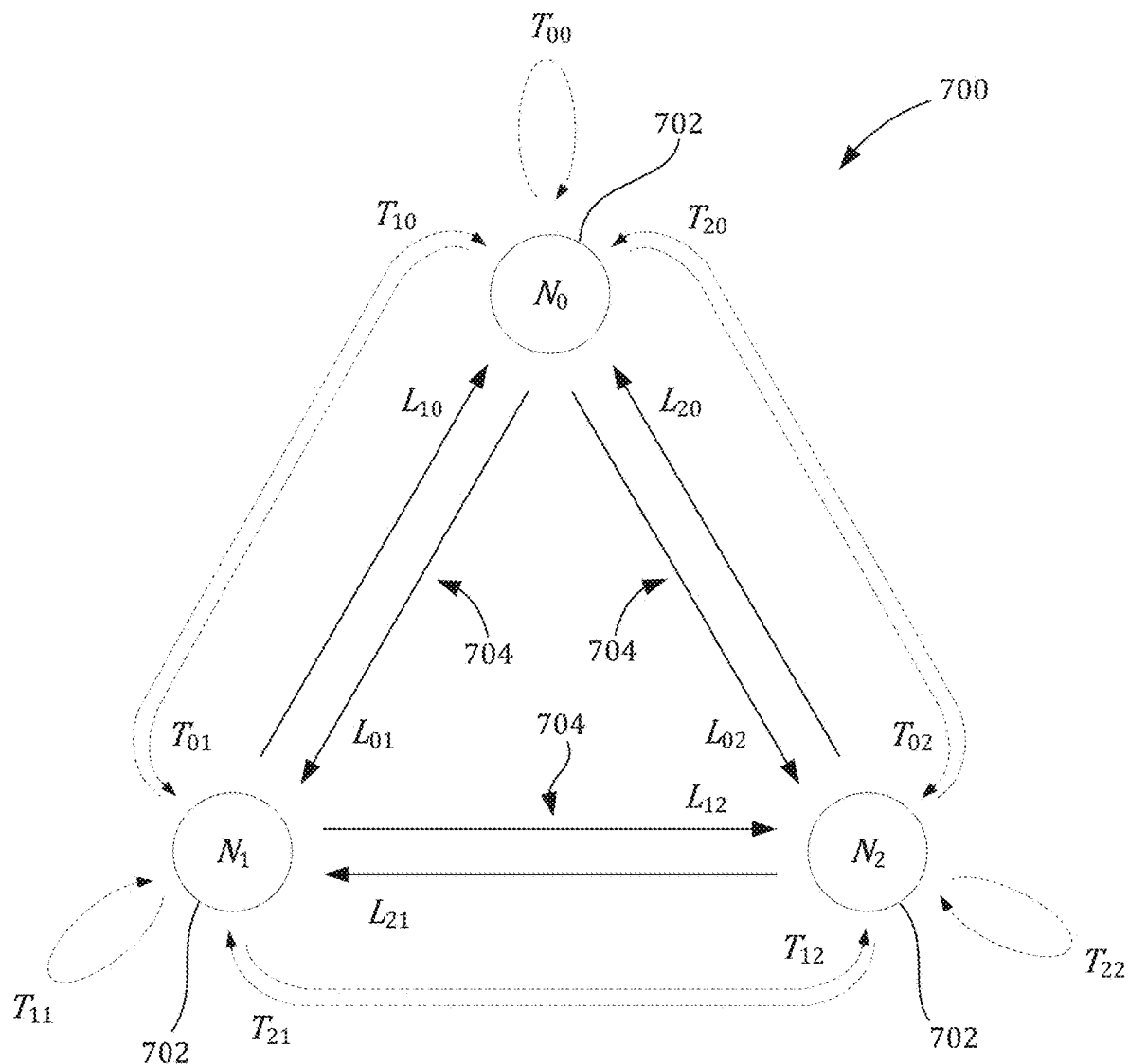
FIG. 7 is a schematic diagram of an example wireless communication network in which dashed arrows indicate potential transitions of detected motion between wireless nodes.

FIG. 7 is a schematic diagram of a wireless communication network 700 in which dashed arrows indicate potential transitions of detected motion between wireless nodes 702. The wireless communication network 700 of FIG. 7 may be analogous to the wireless communication network of FIG. 3. Features common to FIG. 3 and FIG. 7 are related via coordinated numerals that differ in increment by four hundred.

In FIG. 7, dashed arrows represent each potential transition for detected motion between wireless nodes 702 of the wireless communication network 700. The dashed arrows are labeled $T_{ij}$ where a first subscript, i, indicates an originating location and a second subscript, j, indicates a destination location. For example, wireless nodes $N_0$ and $N_1$ may each serve as an originating location and a destination location depending on a particular transition. Transition $T_{01}$ corresponds to the detected motion transitioning from $N_0$ to $N_1$ and transition $T_{10}$ to the detected motion transitioning from $N_1$ to $N_0$.

In some implementations, a node in the wireless communication network 700 obtains a transition probability matrix that includes transition values and non-transition values. The transition values may represent probabilities of motion transitioning between locations associated with distinct wireless communication devices, and the non-transition values representing probabilities of motion remaining within locations associated with the respective wireless communication devices.

In some variations, the transition probability matrix is represented by $T(N_i^t|M_i^{t-1})$ where $M_i^{t-1}$ corresponds to the unique node identifier at which motion was detected during a prior time frame (t−1) and $N_i^t$ corresponds to the unique node identifier to which the detected motion has moved in a present time frame (t). The present time frame may be equivalent to a first time frame. The transition probability matrix, $T(N_i^t|M_i^{t-1})$, includes probability values, $T(N_i^t|M_i^{t-1})$, that can represent either a transition probability value or a non-transition probability value. For example, the transition probability matrix, $T(N_i^t|M_i^{t-1})$, may be expanded according to Eq. (3):

$$T(N_i^t|M_i^{t-1}) = \begin{Bmatrix} T(0^t|0^{t-1}) & \cdots & T(0^t|M_i^{t-1}) \\ \vdots & \ddots & \vdots \\ T(N_i^t|0^{t-1}) & \cdots & T(N_i^t|M_i^{t-1}) \end{Bmatrix} \quad (3)$$

Here, the diagonal terms of transition probability matrix, $T(N_i^t|M_i^{t-1})$, correspond to $N_i^t = M_i^{t-1}$ and the non-diagonal terms correspond to $N_i^t \neq M_i^{t-1}$. The diagonal terms may represent probabilities of transitioning between (or remaining at) the same wireless communication device during the present (or first) time period, e.g., $T(0^t|0^{t-1})$, $T(1^t|1^{t-1})$, $T(2^t|2^{t-1})$, and so forth. As such, the diagonal terms may represent non-transition probability values (or non-transition values). Similarly, the off-diagonal terms represent probabilities of transitioning from one wireless communication device to another during the present (or first) time period, e.g., $T(0^t|2^{t-1})$, $T(3^t|0^{t-1})$, $T(1^t|8^{t-1})$, and so forth. As such, the off-diagonal terms may correspond to transition probability values (or transition values).

For the wireless communication network 700 of FIG. 7, potential transitions $T_{00}$, $T_{11}$, and $T_{22}$ may be represented by respective non-transition probability values $T(0^t|0^{t-1})$, $T(1^t|1^{t-1})$, and $T(2^t|2^{t-1})$. Similarly, potential transitions $T_{01}$, $T_{10}$, $T_{02}$, $T_{20}$, $T_{12}$, and $T_{21}$ may be represented by respective transition probability values $T(1^t|0^{t-1})$, $T(0^t|1^{t-1})$, $T(2^t|0^{t-1})$, $T(0^t|2^{t-1})$, $T(2^t|1^{t-1})$, and $T(1^t|2^{t-1})$. A full matrix, $T(N_i^t|M_i^{t-1})$, may then be constructed according to Eq. (3):

$$T(N_i^t|M_i^{t-1}) = \begin{Bmatrix} T(0^t|0^{t-1}) & T(0^t|1^{t-1}) & T(0^t|2^{t-1}) \\ T(1^t|0^{t-1}) & T(1^t|1^{t-1}) & T(1^t|2^{t-1}) \\ T(2^t|0^{t-1}) & T(2^t|2^{t-1}) & T(2^t|2^{t-1}) \end{Bmatrix}$$

In some instances, the probability values, $T(N_i^t|M_i^{t-1})$, are assigned values based on a stickiness factor. The stickiness factor may be a probability of remaining at a wireless communication device divided by a probability of transitioning away from the wireless communication device (e.g., a probability ratio). For example, for the wireless communication network 700 of FIG. 7, the detected motion may be known to remain, five times out of eight, proximate any given wireless node 702. The stickiness factor may then be determined to be 0.625. As such, the non-transition probability values $T(0^t|0^{t-1})$, $T(1^t|1^{t-1})$, and $T(2^t|2^{t-1})$ may be assigned a value of 0.625. If the probability of transitioning to any one of the other two wireless nodes 702 is the same, the remaining transition probability values may be determined by (1−0.625)/2=0.1875. The transition probability matrix, $T(N_i^t|M_i^{t-1})$, may be constructed as follows:

$$T(N_i^t|M_i^{t-1}) = \begin{Bmatrix} 0.625 & 0.1875 & 0.1875 \\ 0.1875 & 0.625 & 0.1875 \\ 0.1875 & 0.1875 & 0.625 \end{Bmatrix}$$

In some implementations, a node in the wireless communication network 700 determines a location of the motion detected from the wireless signals exchanged during the first time frame. The location determined is based on the first probability vector, the second probability vector, and the transition probability matrix. In further implementations, the wireless communication network 700 generates a third probability vector by combining the first probability vector, the second probability vector and the transition probability matrix. Generating the third probability vector may result from the data processing apparatus executing program instructions. The third probability vector includes the third values representing third probabilities of motion at the respective wireless communication devices during the first time frame. In executing the program instructions, the wireless communication network 300 may also identify a first wireless communication device associated with the highest of the third values. Moreover, the wireless communication network 300 may determine the location of the motion by identifying a location associated with the first wireless communication device as the location of the motion detected during the first time frame.

In some variations, the third probability vector is represented by $P(N_i^t|L_j^t)$, where $N_i^t$ corresponds to the unique node identifier at a first time frame (t) and $L_j^t$ corresponds to the unique link identifier at the first time frame (t). The third probability vector, $P(N_i^t|L_j^t)$, includes third values that represent, at the first time frame, a probability of motion at wireless node, $N_i$, given link activity along wireless link, $L_j$. The third probability vector, $P(N_i^t|L_j^t)$, may be determined according to Eq. (4):

$$P(N_i^t|L_j^t) = \frac{[P(L_j^t|N_i^t) \cdot T(N_i^t|M_i^{t-1})] \cdot P(N_i^t)}{\sum_i P(L_j^t|N_i^t)P(N_i^t)} \quad (4)$$

where $T(N_i^t|M_i^{t-1})$, $P(L_j^t|N_i^t)$, and $P(N_i^t)$ are as described above in relation to Eqs. (1) and (3). Here, the subscript, t, indicates unique node or link identifier from the first time frame (t). During recursive updating of the third probability vector, the third probability vector of a prior time, $P(N_i^{t-1}|L_j^{t-1})$, may serve as the second probability vector, $P(N_i^t)$, of the first time frame. As such, $P(N_i^t)=P(N_i^{t-1}|L_j^{t-1})$ in Eq. (4), producing Eq. (5):

$$P(N_i^t|L_j^t) = \frac{[P(L_j^t|N_i^t) \cdot T(N_i^t|M_i^{t-1})] \cdot P(N_i^{t-1}|L_j^{t-1})}{\sum_i P(L_j^t|N_i^t)P(N_i^{t-1}|L_j^{t-1})} \quad (5)$$

Eqs. (4) and (5) may allow the wireless communication network 700 (or data processing apparatus) to determine the location of detected motion using Bayesian statistics while accounting for potential transitions between wireless nodes 702.

In some implementations, a node in the wireless communication network 700 performs an iterative process for sequential time frames. For example, the node may repeat the operations, over multiple iterations of respective time frames, of obtaining motion data, generating the first probability vector, obtaining the second probability vector, obtaining the transition probability matrix, generating the third probability vector, identifying the first wireless communication device, and determining the location of the motion. In these implementations, the third probability vector of a previous iteration serves as the second probably vector of a present iteration, thereby allowing the third probability vector to be recursively updated.

In some implementations, a node in the wireless communication network 700 obtains the transition probability matrix by selecting between a first transition probability matrix and a second, distinct probability matrix. In some instances, such selections are based on a time of day. For example, program instructions may cause a data processing apparatus to select the first transition probability matrix when the first time frame corresponds to day time and the second transition probability matrix when the first time frame corresponds to night time. Other time periods are possible.

In some implementations, the wireless communication network 700 obtains a consensus value of motion based on the set of motion indicator values. In these implementations, obtaining the transition probability matrix includes selecting between a first transition probability matrix and a second transition probability matrix. The first transition probability matrix can be selected when the consensus value of motion has a first value (e.g., zero), and the second transition probability matrix can be selected when the consensus value of motion has another value (e.g., unity).

In some implementations, the first transition probability matrix is associated with no motion being detected during the first time frame. In some implementations, the second transition probability matrix is associated with motion being detected during the first time frame. In some implementations, the non-transition values of the first transition probability matrix are greater than the transition values of the first transition probability matrix. In some implementations, the transition values of the second transition probability matrix are greater than the non-transition values of the second transition probability matrix.

In some variations, the transition probability matrix is represented by $T(N_i^t|M_i^{t-1}, C)$ where C corresponds to the consensus value of motion. Based on the consensus value of motion, C, one or more probability values $T(N_i^t|M_i^{t-1})$ of the transition probability matrix may be changed or selected, such as through the execution of program instructions by the data processing apparatus. For example, if C=0, the wireless communication network 700 may indicate no detected motion during the first time frame. In response, the data processing apparatus may change or select the probability values $T(N_i^t|M_i^{t-1})$ of the transition probability to define a first transition probability matrix in which the non-transition probability values are greater than the transition probability values. Conversely, if C=1, the wireless communication network 700 may indicate detected motion during the first time frame. In response, the data processing apparatus may change or select the probability values $T(N_i^t|M_i^{t-1})$ to define a second transition probability matrix in which the transition probability values are greater than the non-transition probability values. The second transition probability matrix may reflect a state in which the detected motion has a heightened probability of re-locating to another wireless node 702. Although the consensus value of motion, C, has been presented in the context of binary values, other values are possible for C. For example, the consensus value of motion may correspond to a plurality of values, each have a respective transition probability matrix.

Figure 8:
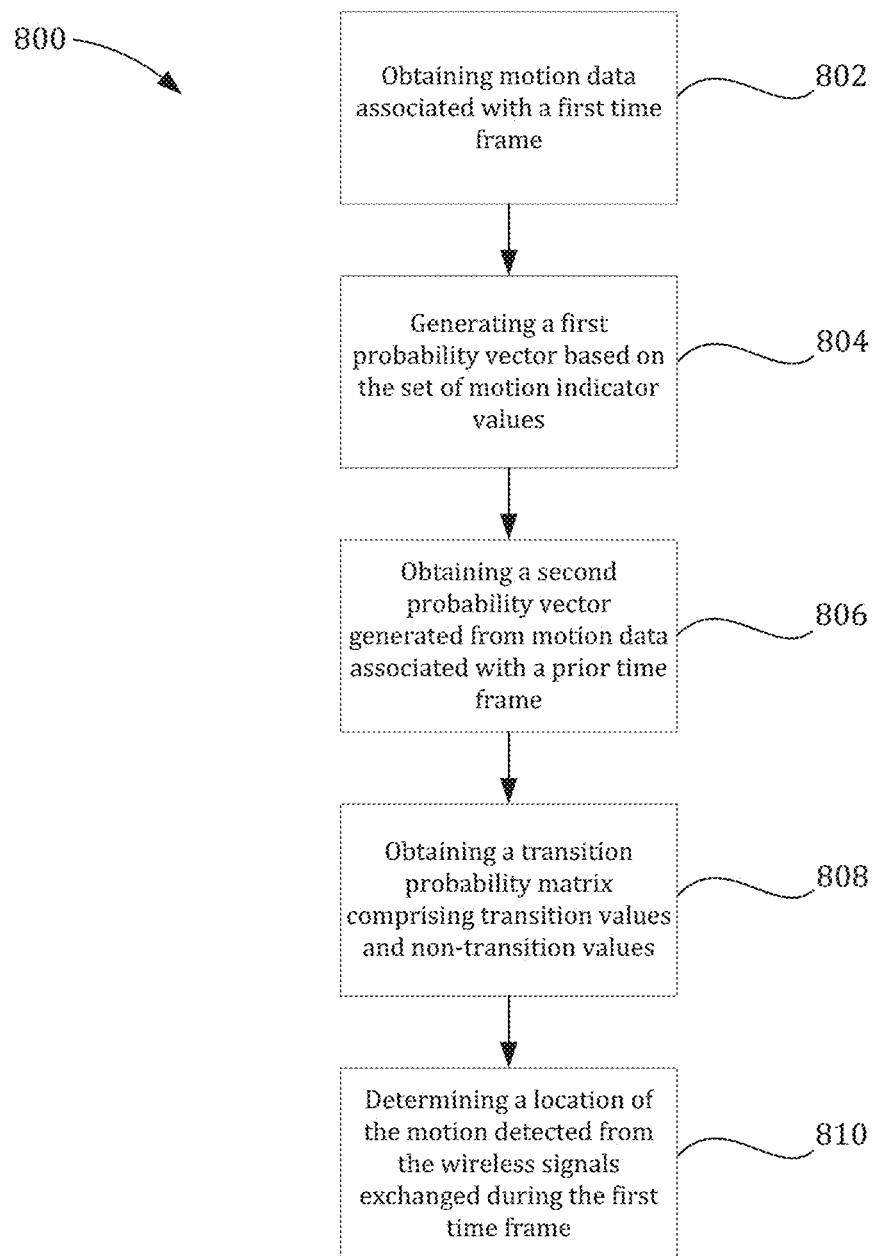
FIG. 8 is a flowchart of another example process for determining a location of motion detected by wireless communication devices in a wireless communication network.

FIG. 8 is a flowchart showing another example process 800 for determining a location of motion detected by wireless communication devices in a wireless communication network. Operations in the example process 800 may be performed by a data processing apparatus (e.g., a processor in a wireless communication device 102 in FIG. 1A) to detect a location of motion based on signals received at wireless communication devices. The example process 800 may be performed by another type of device. For instance, operations of the process 800 may be performed by a system other than a wireless communication device (e.g., a computer system connected to the wireless communication system 100 of FIG. 1A that aggregates and analyzes signals received by the wireless communication devices 102).

The example process 800 may include additional or different operations, and the operations may be performed in the order shown or in another order. In some cases, one or more of the operations shown in FIG. 8 are implemented as processes that include multiple operations, sub-processes or other types of routines. In some cases, operations can be combined, performed in another order, performed in parallel, iterated, or otherwise repeated or performed another manner.

The process 800 includes obtaining motion data associated with a first time frame, as shown by operation 802. The motion data includes a set of motion indicator values indicating motion detected from wireless signals exchanged during the first time frame on a plurality of wireless links in a wireless communication network. Each of the wireless links can be defined between a respective pair of wireless communication devices in the wireless communication network, and each of the motion indicator values is associated with a respective wireless link.

The example process 800 also includes generating a first probability vector based on the set of motion indicator values, as shown by operation 804. The first probability vector includes first values assigned to the respective wireless communication devices. The first values represent first probabilities of motion at the respective wireless communication devices during the first time frame. The example process 800 additionally includes obtaining a second probability vector generated from motion data associated with a prior time frame, as shown by operation 806. The second probability vector includes second values assigned to the respective wireless communication devices. The second values represent prior probabilities of motion at the respective wireless communication devices during the prior time frame.

The example process 800 also includes obtaining a transition probability matrix that includes transition values and non-transition values, as shown by operation 808. The transition values represent probabilities of motion transitioning between locations associated with distinct wireless communication devices, and the non-transition values representing probabilities of motion remaining within locations associated with the respective wireless communication devices. The example process 800 yet additionally includes determining, by operation of a data processing apparatus, a location of the motion detected from the wireless signals exchanged during the first time frame, as shown by operation 810. The location determined is based on the first probability vector, the second probability vector, and the transition matrix.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, program instructions, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In some aspects of what is described, motion may be detected by exchanging wireless signals between wireless communication devices in a wireless communication network. In some cases, location of the detected motion may also be determined, as described by the following examples:

Example 1

A method comprising:
 obtaining motion data associated with a first time frame, the motion data comprising a set of motion indicator values indicating motion detected from wireless signals exchanged during the first time frame on a plurality of wireless links in a wireless communication network, each of the wireless links defined between a respective pair of wireless communication devices in the wireless communication network, each of the motion indicator values associated with a respective wireless link;
 identifying a first wireless link, of the plurality of wireless links, based on a magnitude of a motion indicator value associated with the first wireless link relative to the other motion indicator values in the set of motion indicator values;
 generating a first probability vector based on a predetermined map and the first wireless link, the first probability vector comprising first values assigned to the respective wireless communication devices, the first values representing first probabilities of motion at the respective wireless communication devices during the first time frame;
 obtaining a second probability vector generated from motion data associated with a prior time frame, the second probability vector comprising second values assigned to the respective wireless communication devices, the second values representing prior probabilities of motion at the respective wireless communication devices during the prior time frame; and
 determining, by operation of a data processing apparatus, a location of the motion detected from the wireless signals exchanged during the first time frame, the location determined based on the second probability vector and the first probability vector.

Example 2

The method of example 1, comprising:
 generating a third probability vector by combining the second values from the second probability vector with the first values from the first probability vector, the third probability vector comprising third values assigned to the respective wireless communication devices, the third values representing current probabilities of motion at the respective wireless communication devices during the first time frame;
 identifying a first wireless communication device associated with the highest of the third values; and
 wherein determining the location comprises identifying a location associated with the wireless communication device as the location of the motion detected during the first time frame.

Example 3

The method of example 2, comprising:
 repeating the operations, over multiple iterations for respective time frames, of obtaining motion data, identifying the first wireless link, generating the first probability vector, obtaining the second probability vector, generating the third probability vector, identifying the wireless communication device, and determining the location of the motion; and
 wherein the third probability vector of a previous iteration serves as the second probability vector of a present iteration, thereby allowing the third probability vector to be recursively updated.

Example 4

The method of example 1 or any one of examples 2-3, wherein the plurality of wireless links comprises sets of wireless links that allow bi-directional communication between a respective pair of wireless devices, each set of wireless links having at least one wireless link per direction in the bi-directional communication.

Example 5

The method of example 1 or any one of examples 2-4, wherein the magnitude of the motion indicator value associated with the first wireless link is a highest motion indicator value in the set of motion indicator values.

Example 6

The method of example 1 or any one of examples 2-5, wherein the predetermined map comprises:
 a first map value assigned to a transmitting wireless communication device of the first wireless link; and
 a second map value assigned to a receiving wireless communication device of the first wireless link.

Example 7

The method of example 6, wherein the first map value corresponds to a highest first value of the first probability vector and the second map value correspond to a second-highest first value of the first probability vector.

Example 8

The method of example 6 or 7, wherein the predetermined map comprises a third map value assigned to one or more wireless communication devices not associated with the first wireless link.

Example 9

The method of example 1,
wherein identifying a first wireless link comprises identifying a first subset of the plurality of wireless links based on magnitudes of a motion indicator values associated with the respective wireless links; and
wherein generating a first probability vector comprises generating a first probability vector for each of the first subset of wireless links based on the predetermined map and each respective wireless link in the first subset.

Example 10

The method of example 9,
wherein the first subset of wireless links comprises the first wireless link and a second wireless link;
wherein the magnitude of the motion indicator associated with the first wireless link is a highest motion indicator value; and
wherein the magnitude of the motion indicator associated with the second wireless link is a second-highest motion indicator value.

Example 11

The method of example 9 or 10, comprising:
generating a third probability vector by combining the second values from the second probability vector with the first values from each respective first probability vector, the third probability vector comprising third values assigned to the respective wireless communication devices, the third values representing current probabilities of motion at the respective wireless communication devices during the first time frame;
identifying a first wireless communication device associated with the highest of the third values; and
wherein determining the location comprises identifying a location associated with the first wireless communication device as the location of the motion detected during the first time frame.

Example 12

The method of example 11, comprising:
repeating the operations, over multiple iterations for respective time frames, of obtaining motion data, identifying the first wireless link, generating the first probability vector, obtaining the second probability vector, generating the third probability vector, identifying the wireless communication device, and determining the location of the motion; and
wherein the third probability vector of a previous iteration serves as the second probability vector of a present iteration, thereby allowing the third probability vector to be recursively updated.

Example 13

A motion detection system comprising:
a plurality of wireless communication devices configured to exchange wireless signals on a plurality of wireless links, each of the wireless links defined between a respective pair of the wireless communication devices; and
a data processing apparatus configured to perform one or more operations of any one of Examples 1 through 12.

Example 14

A non-transitory computer-readable medium comprising instructions that, when executed, cause data processing apparatus to perform one or more operations of any one of Examples 1 through 12.

In some cases, the location of the detected motion may be determined using a transition probability matrix, as shown by the following examples:

Example 15

A method comprising:
obtaining motion data associated with a first time frame, the motion data comprising a set of motion indicator values indicating motion detected from wireless signals exchanged during the first time frame on a plurality of wireless links in a wireless communication network, each of the wireless links defined between a respective pair of wireless communication devices in the wireless communication network, each of the motion indicator values associated with a respective wireless link;
generating a first probability vector based on the set of motion indicator values, the first probability vector comprising first values assigned to the respective wireless communication devices, the first values representing first probabilities of motion at the respective wireless communication devices during the first time frame;
obtaining a second probability vector generated from motion data associated with a prior time frame, the second probability vector comprising second values assigned to the respective wireless communication devices, the second values representing prior probabilities of motion at the respective wireless communication devices during the prior time frame;
obtaining a transition probability matrix comprising:
transition values representing probabilities of motion transitioning between locations associated with distinct wireless communication devices, and
non-transition values representing probabilities of motion remaining within locations associated with the respective wireless communication devices; and
determining, by operation of a data processing apparatus, a location of the motion detected from the wireless signals exchanged during the first time frame, the location determined based on the first probability vector, the second probability vector, and the transition probability matrix.

Example 16

The method of example 15, comprising:
generating a third probability vector by combining the first probability vector, the second probability vector and the transition probability matrix, the third probability vector comprising the third values representing third probabilities of motion at the respective wireless communication devices during the first time frame;
identifying a first wireless communication device associated with the highest of the third values; and
wherein determining the location comprises identifying a location associated with the first wireless communication device as the location of the motion detected during the first time frame.

Example 17

The method of example 16, comprising:
repeating the operations, over multiple iterations of respective time frames, of obtaining motion data, generating the first probability vector, obtaining the second probability vector, obtaining the transition probability matrix, generating the third probability vector, identifying the wireless communication device, and determining the location of the motion; and
wherein the third probability vector of a previous iteration serves as the second probability vector of a present iteration, thereby allowing the third probability vector to be recursively updated.

Example 18

The method of example 15 or any one of examples 16-17, wherein the plurality of wireless links comprises sets of wireless links that allow bi-directional communication between a respective pair of wireless devices, each set of wireless links having at least one wireless link per direction in the bi-directional communication.

Example 19

The method of example 15 or any one of examples 16-18, comprising:
identifying a first wireless link, of the plurality of wireless links, based on a magnitude of a motion indicator value associated with the first wireless link relative to the other motion indicator values in the set of motion indicator values.

Example 20

The method of example 19, wherein the magnitude of the motion indicator value associated with the first wireless link is a highest motion indicator value in the set of motion indicator values.

Example 21

The method of example 15 or any one of examples 16-20, wherein generating the first probability vector comprises:
generating the first probability vector based on the set of motion indicator values and a predetermined map.

Example 22

The method of example 21, wherein the predetermined map comprises:
a first map value assigned to a transmitting wireless communication device of the identified first wireless link; and
a second map value assigned to a receiving wireless communication device of the identified first wireless link.

Example 23

The method of example 22, wherein the first map value corresponds to a highest first value of the first probability vector and the second map value corresponds to a second-highest first value of the first probability vector.

Example 24

The method of example 15 or any one of examples 16-23, wherein obtaining the transition probability matrix comprises selecting between a first transition probability matrix and a second, distinct transition probability matrix.

Example 25

The method of example 24, wherein the first transition probability matrix is selected when the first time frame corresponds to day time and the second transition probability matrix is selected when the first time frame corresponds to night time.

Example 26

The method of example 15 or any one of examples 16-23, comprising:
obtaining a consensus value of motion based on the set of motion indicator values; and
wherein obtaining the transition probability matrix comprises selecting between a first transition probability matrix and a second transition probability matrix, the first transition probability matrix selected when the consensus value of motion has a first value, the second transition probability matrix selected when the consensus value of motion has a second value.

Example 27

The method of example 26, wherein the first transition probability matrix is associated with no motion being detected during the first time frame.

Example 28

The method of example 26 or 27, wherein the second transition probability matrix is associated with motion being detected during the first time frame Example 29

The method of example 26 or any one of examples 27-28, wherein the non-transition values of the first transition probability matrix are greater than the transition values of the first probability transition matrix.

Example 30

The method of example 26 or or any one of examples 27-29, wherein the transition values of the second transition probability matrix are greater than the non-transition values of the second transition probability matrix.

Example 31

The method of example 26 or any one of examples 27-30, wherein the transition values and the non-transition values of the first transition probability matrix vary based on a time of day.

Example 32

The method of example 26 or any one of examples 27-31, wherein the transition values and the non-transition values of the second transition probability matrix vary based on a time of day.

Example 33

A motion detection system comprising:
a plurality of wireless communication devices configured to exchange wireless signals on a plurality of wireless links, each of the wireless links defined between a respective pair of the wireless communication devices; and
a data processing apparatus configured to perform one or more of the operations of any one of Examples 15 through 32.

Example 34

A non-transitory computer-readable medium comprising instructions that, when executed, cause the data processing apparatus to perform one or more of the operations of any one of Examples 15 through 32.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
obtaining motion data associated with a first time frame, the motion data comprising a set of motion indicator values indicating motion detected from wireless signals exchanged during the first time frame on a plurality of wireless links in a wireless communication network, each of the wireless links defined between a respective pair of wireless communication devices in the wireless communication network, each of the motion indicator values associated with a respective wireless link, the set of motion indicator values representing a level of disturbance detected on the respective wireless links that communicated the wireless signals during the first time frame;
generating a first probability vector based on the set of motion indicator values, the first probability vector comprising first values assigned to the respective wireless communication devices, the first values representing first probabilities of motion at the respective wireless communication devices during the first time frame;
obtaining a second probability vector generated from motion data associated with a prior time frame, the second probability vector comprising second values assigned to the respective wireless communication devices, the second values representing prior probabilities of motion at the respective wireless communication devices during the prior time frame;
obtaining a transition probability matrix comprising:
transition values representing probabilities of motion transitioning between locations associated with distinct wireless communication devices, and
non-transition values representing probabilities of motion remaining within locations associated with the respective wireless communication devices; and
determining, by operation of a data processing apparatus, a location of the motion detected from the wireless signals exchanged during the first time frame, the location determined based on the first probability vector, the second probability vector, and the transition probability matrix.

2. The method of claim 1, comprising:
generating a third probability vector by combining the first probability vector, the second probability vector and the transition probability matrix, the third probability vector comprising the third values representing third probabilities of motion at the respective wireless communication devices during the first time frame;
identifying a first wireless communication device associated with a highest of the third values; and
wherein determining the location comprises identifying a location associated with the first wireless communication device as the location of the motion detected during the first time frame.

3. The method of claim 2, comprising:
repeating the operations, over multiple iterations of respective time frames, of obtaining motion data, generating the first probability vector, obtaining the second probability vector, obtaining the transition probability matrix, generating the third probability vector, identifying the first wireless communication device, and determining the location of the motion; and
wherein the third probability vector of a previous iteration serves as the second probability vector of a present iteration, thereby allowing the third probability vector to be recursively updated.

4. The method of claim 1, wherein the plurality of wireless links comprises sets of wireless links that allow bi-directional communication between a respective pair of wireless devices, each set of wireless links having at least one wireless link per direction in the bi-directional communication.

5. The method of claim 1, comprising:
identifying a first wireless link, of the plurality of wireless links, based on a magnitude of a motion indicator value associated with the first wireless link relative to the other motion indicator values in the set of motion indicator values.

6. The method of claim 5, wherein the magnitude of the motion indicator value associated with the first wireless link is a highest motion indicator value in the set of motion indicator values.

7. The method of claim 1, wherein generating the first probability vector comprises:
generating the first probability vector based on the set of motion indicator values and a predetermined map, the predetermined map comprising:
a first map value assigned to a transmitting wireless communication device of the identified first wireless link; and
a second map value assigned to a receiving wireless communication device of the identified first wireless link.

8. The method of claim 1, wherein obtaining the transition probability matrix comprises selecting between a first transition probability matrix and a second, distinct transition probability matrix.

9. The method of claim 8, wherein the first transition probability matrix is selected when the first time frame corresponds to day time and the second transition probability matrix is selected when the first time frame corresponds to night time.

10. The method of claim 1, comprising:
obtaining a consensus value of motion based on the set of motion indicator values; and
wherein obtaining the transition probability matrix comprises selecting between a first transition probability matrix and a second transition probability matrix, the first transition probability matrix selected when the consensus value of motion has a first value, the second transition probability matrix selected when the consensus value of motion has a second, distinct value.

11. The method of claim 10,
wherein the first transition probability matrix is associated with no motion being detected during the first time frame; and
wherein the non-transition values of the first transition probability matrix are greater than the transition values of the first transition probability matrix.

12. The method of claim 10,
wherein the second transition probability matrix is associated with motion being detected during the first time frame; and
wherein the transition values of the second transition probability matrix are greater than the non-transition values of the second transition probability matrix.

13. A motion detection system comprising:
a plurality of wireless communication devices configured to exchange wireless signals on a plurality of wireless links, each of the wireless links defined between a respective pair of the wireless communication devices; and
a data processing apparatus configured to perform operations comprising:
obtaining motion data associated with a first time frame, the motion data comprising a set of motion indicator values indicating motion detected from wireless signals exchanged during the first time frame on the plurality of wireless links, each of the motion indicator values associated with a respective wireless link, the set of motion indicator values representing a level of disturbance detected on the respective wireless links that communicated the wireless signals during the first time frame;
generating a first probability vector based on the set of motion indicator values, the first probability vector comprising first values assigned to the respective wireless communication devices, the first values representing first probabilities of motion at the respective wireless communication devices during the first time frame;
obtaining a second probability vector generated from motion data associated with a prior time frame, the second probability vector comprising second values assigned to the respective wireless communication devices, the second values representing prior probabilities of motion at the respective wireless communication devices during the prior time frame;
obtaining a transition probability matrix comprising:
transition values representing probabilities of motion transitioning between locations associated with distinct wireless communication devices, and
non-transition values representing probabilities of motion remaining within locations associated with the respective wireless communication devices; and
determining a location of the motion detected from the wireless signals exchanged during the first time frame, the location determined based on the first probability vector, the second probability vector, and the transition probability matrix.

14. The motion detection system of claim 13, wherein the operations comprise:
generating a third probability vector by combining the first probability vector, the second probability vector and the transition probability matrix, the third probability vector comprising the third values representing third probabilities of motion at the respective wireless communication devices during the first time frame;
identifying a first wireless communication device associated with a highest of the third values; and
wherein determining the location comprises identifying a location associated with the first wireless communication device as the location of the motion detected during the first time frame.

15. The motion detection system of claim 14, wherein the operations comprise:
repeating the operations, over multiple iterations of respective time frames, of obtaining motion data, generating the first probability vector, obtaining the second probability vector, obtaining the transition probability matrix, generating the third probability vector, identifying the first wireless communication device, and determining the location of the motion; and
wherein the third probability vector of a previous iteration serves as the second probability vector of a present iteration, thereby allowing the third probability vector to be recursively updated.

16. The motion detection system of claim 13, wherein the plurality of wireless links comprises sets of wireless links that allow bi-directional communication between a respective pair of wireless devices, each set of wireless links having at least one wireless link per direction in the bi-directional communication.

17. The motion detection system of claim 13, comprising:
identifying a first wireless link, of the plurality of wireless links, based on a magnitude of a motion indicator value associated with the first wireless link relative to the other motion indicator values in the set of motion indicator values.

18. The motion detection system of claim 13, wherein a wireless communication device comprises the data processing apparatus.

19. The motion detection system of claim 13, wherein generating the first probability vector comprises:
generating the first probability vector based on the set of motion indicator values and a predetermined map, the predetermined map comprising:
a first map value assigned to a transmitting wireless communication device of the identified first wireless link; and
a second map value assigned to a receiving wireless communication device of the identified first wireless link.

20. The motion detection system of claim 13, wherein obtaining the transition probability matrix comprises selecting between a first transition probability matrix and a second, distinct transition probability matrix.

21. The motion detection system of claim 13, wherein the operations comprise:
obtaining a consensus value of motion based on the set of motion indicator values; and
wherein obtaining the transition probability matrix comprises selecting between a first transition probability matrix and a second transition probability matrix, the first transition probability matrix selected when the consensus value of motion has a first value, the second transition probability matrix selected when the consensus value of motion has a second, distinct value.

22. A non-transitory computer-readable medium containing program instructions for causing a data processing apparatus to perform operations comprising:
obtaining motion data associated with a first time frame, the motion data comprising a set of motion indicator values indicating motion detected from wireless signals exchanged during the first time frame on a plurality of wireless links in a wireless communication network, each of the wireless links defined between a respective pair of wireless communication devices in the wireless communication network, each of the motion indicator values associated with a respective wireless link, the set of motion indicator values representing a level of disturbance detected on the respective wireless links that communicated the wireless signals during the first time frame;
generating a first probability vector based on the set of motion indicator values, the first probability vector comprising first values assigned to the respective wireless communication devices, the first values representing first probabilities of motion at the respective wireless communication devices during the first time frame;
obtaining a second probability vector generated from motion data associated with a prior time frame, the second probability vector comprising second values assigned to the respective wireless communication devices, the second values representing prior probabilities of motion at the respective wireless communication devices during the prior time frame;
obtaining a transition probability matrix comprising:
transition values representing probabilities of motion transitioning between locations associated with distinct wireless communication devices, and
non-transition values representing probabilities of motion remaining within locations associated with the respective wireless communication devices; and
determining a location of the motion detected from the wireless signals exchanged during the first time frame, the location determined based on the first probability vector, the second probability vector, and the transition probability matrix.

23. The non-transitory computer-readable medium of claim 22, wherein the operations comprise:
generating a third probability vector by combining the first probability vector, the second probability vector and the transition probability matrix, the third probability vector comprising the third values representing third probabilities of motion at the respective wireless communication devices during the first time frame;
identifying a first wireless communication device associated with a highest of the third values; and
wherein determining the location comprises identifying a location associated with the first wireless communication device as the location of the motion detected during the first time frame.

24. The non-transitory computer-readable medium of claim 23, wherein the operations comprise:
repeating the operations, over multiple iterations of respective time frames, of obtaining motion data, generating the first probability vector, obtaining the second probability vector, obtaining the transition probability matrix, generating the third probability vector, identifying the first wireless communication device, and determining the location of the motion; and
wherein the third probability vector of a previous iteration serves as the second probability vector of a present iteration, thereby allowing the third probability vector to be recursively updated.

25. The non-transitory computer-readable medium of claim 22, wherein the plurality of wireless links comprises sets of wireless links that allow bi-directional communication between a respective pair of wireless devices, each set of wireless links having at least one wireless link per direction in the bi-directional communication.

26. The non-transitory computer-readable medium of claim 22 comprising:
identifying a first wireless link, of the plurality of wireless links, based on a magnitude of a motion indicator value associated with the first wireless link relative to the other motion indicator values in the set of motion indicator values.

27. The non-transitory computer-readable medium of claim 22, wherein a wireless communication device comprises the data processing apparatus.

28. The non-transitory computer-readable medium of claim 22, wherein generating the first probability vector comprises:
generating the first probability vector based on the set of motion indicator values and a predetermined map, the predetermined map comprising:
a first map value assigned to a transmitting wireless communication device of the identified first wireless link; and
a second map value assigned to a receiving wireless communication device of the identified first wireless link.

29. The non-transitory computer-readable medium of claim 22, wherein obtaining the transition probability matrix comprises selecting between a first transition probability matrix and a second, distinct transition probability matrix.

30. The non-transitory computer-readable medium of claim 22, wherein the operations comprise:
   obtaining a consensus value of motion based on the set of motion indicator values; and
   wherein obtaining the transition probability matrix comprises selecting between a first transition probability matrix and a second transition probability matrix, the first transition probability matrix selected when the consensus value of motion has a first value, the second transition probability matrix selected when the consensus value of motion has a second, distinct value.

* * * * *